US011689687B2

(12) United States Patent
Tanaka et al.

(10) Patent No.: US 11,689,687 B2
(45) Date of Patent: Jun. 27, 2023

(54) VIDEO CREATION METHOD

(71) Applicant: FUJIFILM Corporation, Tokyo (JP)

(72) Inventors: Koichi Tanaka, Saitama (JP); Tetsu Wada, Saitama (JP); Yukinori Nishiyama, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/746,972

(22) Filed: May 18, 2022

(65) Prior Publication Data
US 2022/0279136 A1    Sep. 1, 2022

Related U.S. Application Data

(63) Continuation of application No. PCT/JP2020/039485, filed on Oct. 21, 2020.

(30) Foreign Application Priority Data

Nov. 25, 2019 (JP) ............................. JP2019-212128

(51) Int. Cl.
*H04N 5/268* (2006.01)
*G02B 7/34* (2021.01)
(Continued)

(52) U.S. Cl.
CPC ............. *H04N 5/268* (2013.01); *G02B 7/34* (2013.01); *G03B 7/08* (2013.01); *H04N 5/77* (2013.01); *H04N 23/75* (2023.01)

(58) Field of Classification Search
CPC .......... H04N 5/268; H04N 5/77; H04N 5/272; H04N 5/772; H04N 23/75; H04N 23/632;
(Continued)

(56) References Cited

U.S. PATENT DOCUMENTS 10,484,651 B2    11/2019  Watanabe et al.
2016/0336041 A1 *  11/2016  Mukai .................... H04N 23/61

FOREIGN PATENT DOCUMENTS

JP    H11220653    8/1999
JP    2004194309    7/2004
(Continued)

OTHER PUBLICATIONS

"International Search Report (Form PCT/ISA/210) of PCT/JP2020/039485," dated Jan. 12, 2021, with English translation thereof, pp. 1-5.

(Continued)

*Primary Examiner* — Nelson D. Hernández Hernández
(74) *Attorney, Agent, or Firm* — JCIPRNET

(57) ABSTRACT

Provided is a video creation method in which, in a configuration in which a part of a captured video is extracted and displayed, the adjustment of an exposure amount and the video display in a case in which an extracted region is changed are appropriately executed.

A video creation method according to an embodiment of the present invention includes setting, in an imaging region of a reference video having a first angle of view, a plurality of regions having a second angle of view smaller than the first angle of view, selecting a selection region of a recorded video from among the plurality of regions, reselecting the selection region from among the plurality of regions to switch the selection region, recording each of a pre-switching video and a post-switching video, displaying the post-switching video after the pre-switching video is displayed and displaying an insertion video in a period between a display period of the pre-switching video and a display period of the post-switching video, and adjusting, during a display period of the insertion video, an exposure amount and the like of a post-switching selection region.

20 Claims, 15 Drawing Sheets

(51) Int. Cl.
    *G03B 7/08*     (2021.01)
    *H04N 5/77*     (2006.01)
    *H04N 23/75*     (2023.01)

(58) Field of Classification Search
    CPC .. H04N 23/635; H04N 23/671; H04N 23/672; H04N 23/673; H04N 23/71; H04N 23/72; H04N 23/73; H04N 23/76; G02B 7/34; G03B 7/08
    See application file for complete search history.

(56) References Cited

FOREIGN PATENT DOCUMENTS

| | | |
|---|---|---|
| JP | 2010232814 | 10/2010 |
| JP | 2014042357 | 3/2014 |
| JP | 2016219905 | 12/2016 |
| WO | 2017002708 | 1/2017 |

OTHER PUBLICATIONS

"Written Opinion of the International Searching Authority (Form PCT/ISA/237) of PCT/JP2020/039485," dated Jan. 12, 2021, with English translation thereof, pp. 1-6.

\* cited by examiner

VIDEO CREATION METHOD

CROSS-REFERENCE TO RELATED APPLICATIONS

This application is a Continuation of PCT International Application No. PCT/JP2020/039485 filed on Oct. 21, 2020, which claims priority under 35 U.S.C. § 119(a) to Japanese Patent Application No. 2019-212128 filed on Nov. 25, 2019. The above application is hereby expressly incorporated by reference, in its entirety, into the present application.

BACKGROUND OF THE INVENTION

1. Field of the Invention

One embodiment of the present invention relates to a video creation method of creating a video file based on a video by capturing the video using an imaging apparatus.

2. Description of the Related Art

In a case in which a video of each of a plurality of subjects is acquired in a certain scene, the video of the scene may be captured by one imaging apparatus to extract and display the video of each subject from the captured video. Examples of such a technique include the techniques disclosed in JP1999-220653A (JP-H11-220653A), JP2004-194309A, and JP2014-42357A.

JP1999-220653A (JP-H11-220653A) discloses a technique of cutting out a part of an original image captured by one camera to generate a cut-out image, controlling a cut-out position, and outputting the cut-out image such that a position of a subject is changed.

JP2004-194309A discloses a technique of detecting a plurality of objects based on a high-resolution wide-angle video captured by one camera, cutting out a video of each detected object from the wide-angle video, and displaying the videos of the plurality of objects on a monitor in parallel.

JP2014-42357A discloses a technique of designating a plurality of any areas from a video captured by one imaging apparatus, cutting out videos corresponding to the designated plurality of any areas, and outputting the cut-out videos.

SUMMARY OF THE INVENTION

In a case in which a part of the video is extracted and displayed, an image quality of the extracted video is determined in accordance with conditions, such as an exposure amount at the time of imaging, white balance, and lens focus. In a case in which these conditions are set to appropriate values, the extracted video has a good image quality.

On the other hand, the appropriate conditions for the extracted video are determined in accordance with a position of the extracted region in an original video. In consideration of the above, in a case in which the position of the extracted region is changed, it is necessary to adjust the conditions, such as the exposure amount, again in accordance with the changed extracted region.

It should be noted that there is a risk that the extracted video in a state in which the adjustment of the exposure amount condition is in progress is not an appropriate video due to an unstable image quality and incompletion of the adjustment. Therefore, in a case in which the conditions, such as the exposure amount, are adjusted immediately after the extracted region is changed and the extracted video is displayed in the middle state, the discomfort may be given to a viewer (user) of the video.

One embodiment of the present invention has been made in view of the above circumstances, and is to provide a video creation method in which, in a configuration in which a part of the video captured by an imaging apparatus is extracted and displayed, the adjustment of the conditions, such as the exposure amount, and the video display in a case in which the extracted region is changed are appropriately executed.

In order to achieve the above object, an aspect of the present invention relates to a video creation method of creating a video file based on a video captured by an imaging apparatus including an imaging lens and an imaging element, the method comprising a setting step of setting, in an imaging region of a reference video having a first angle of view, a plurality of regions having a second angle of view smaller than the first angle of view, a selection step of selecting a selection region in which a recorded video is reflected from among the plurality of regions, a switching step of reselecting the selection region from among the plurality of regions to switch the selection region after the selection step is executed, a recording step of recording each of a pre-switching video which is a video of the selection region before the switching step and a post-switching video which is a video of the selection region after the switching step, a display step of displaying the post-switching video after the pre-switching video is displayed and displaying an insertion video in a period between a display period of the pre-switching video and a display period of the post-switching video, and an adjustment step of adjusting, during a display period of the insertion video, at least one of an exposure amount of the selection region after the switching step, white balance of the post-switching video, or focus of the imaging lens after the switching step.

In addition, in the video creation method according to the aspect of the present invention, the insertion video may be a video based on the pre-switching video and the post-switching video. Alternatively, the insertion video may be a video based on none of the reference video, the pre-switching video, and the post-switching video.

In addition, in the video creation method according to the aspect of the present invention, in the recording step, the pre-switching video and the post-switching video may be combined to create a motion picture file.

In addition, it is more preferable that, in the recording step, the insertion video be excluded from a recording target.

In addition, in the video creation method of the embodiment of the present invention, the exposure amount may be adjusted by adjusting a stop amount of an incidence ray on the imaging lens. In this case, in a case in which the stop amount or the focus is adjusted in the adjustment step, a length of the display period of the insertion video may be changed in accordance with a required time for adjusting the stop amount or the focus in the adjustment step.

In addition, it is more preferable that, in a case in which the required time is equal to or longer than a predetermined time, in the display step, the insertion video including information relating to the required time be displayed.

In addition, in the video creation method of the embodiment of the present invention, the exposure amount may be adjusted by adjusting a stop amount of an incidence ray on the imaging lens. In this case, it is preferable that, in a case in which the stop amount or the focus is adjusted in the adjustment step, in the display period of the insertion video, an adjustment speed of the stop amount or the focus be faster than in a period other than the display period of the insertion video.

In addition, in the video creation method according to the aspect of the present invention, a mode for adjusting the focus may be selected from among a manual focus mode in which the focus is manually adjusted based on an operation of a user and an autofocus mode in which the focus is automatically adjusted. In addition, in a case in which the manual focus mode is selected, in the adjustment step during the display period of the insertion video, the focus may be automatically adjusted.

In addition, as a method of automatically adjusting the focus, a first method of contrast autofocus, and a second method selected from among image plane phase difference autofocus, directional light beam autofocus, and depth-from-defocus method autofocus may be used. Moreover, in the adjustment step during the display period of the insertion video, the focus may be adjusted by the second method.

Further, in the configuration described above, the exposure amount may be adjusted by adjusting a stop amount for an incidence ray on the imaging lens. Moreover, the second method may be the image plane phase difference autofocus, and in the adjustment step during the display period of the insertion video, the focus may be adjusted by the second method regardless of a value of the stop amount.

In addition, in the video creation method according to the aspect of the present invention, in a case in which the imaging apparatus does not have a function of automatically adjusting the focus, the focus may be manually adjusted based on an operation of a user. In this case, in the display step, the insertion video including guide information for manually adjusting the focus may be displayed.

In addition, in the video creation method according to the aspect of the present invention, a mode for adjusting the exposure amount may be selected from among a manual adjustment mode in which the exposure amount is manually adjusted based on an operation of a user and an auto adjustment mode in which the exposure amount is automatically adjusted. In addition, in a case in which the manual adjustment mode is selected, in the adjustment step during the display period of the insertion video, the exposure amount may be automatically adjusted.

Further, another aspect of the present invention relates to a video creation apparatus that creates a video file based on a video captured by an imaging apparatus including an imaging lens and an imaging element, the apparatus comprising a processor, in which the processor is configured to execute a setting step of setting, in an imaging region of a reference video having a first angle of view, a plurality of regions having a second angle of view smaller than the first angle of view, a selection step of selecting a selection region in which a recorded video is reflected from among the plurality of regions, a switching step of reselecting the selection region from among the plurality of regions to switch the selection region after the selection step is executed, a recording step of recording each of a pre-switching video which is a video of the selection region before the switching step and a post-switching video which is a video of the selection region after the switching step, a display step of displaying the post-switching video after the pre-switching video is displayed and displaying an insertion video in a period between a display period of the pre-switching video and a display period of the post-switching video, and an adjustment step of adjusting, during a display period of the insertion video, at least one of an exposure amount of the selection region after the switching step, white balance of the post-switching video, or focus of the imaging lens after the switching step.

DESCRIPTION OF THE PREFERRED EMBODIMENTS

In the following, preferred embodiments (first to fifth embodiments) of the present invention will be described in detail referring to the accompanying drawings.

It should be noted that the embodiments described below are merely examples for ease of understanding of one embodiment of the present invention, and are not intended to limit the present invention. That is, one embodiment of the present invention can be changed or modified from the embodiments described below without departing from the spirit of the present invention. In addition, one embodiment of the present invention includes an equivalent thereof.

First Embodiment

Figure 1:
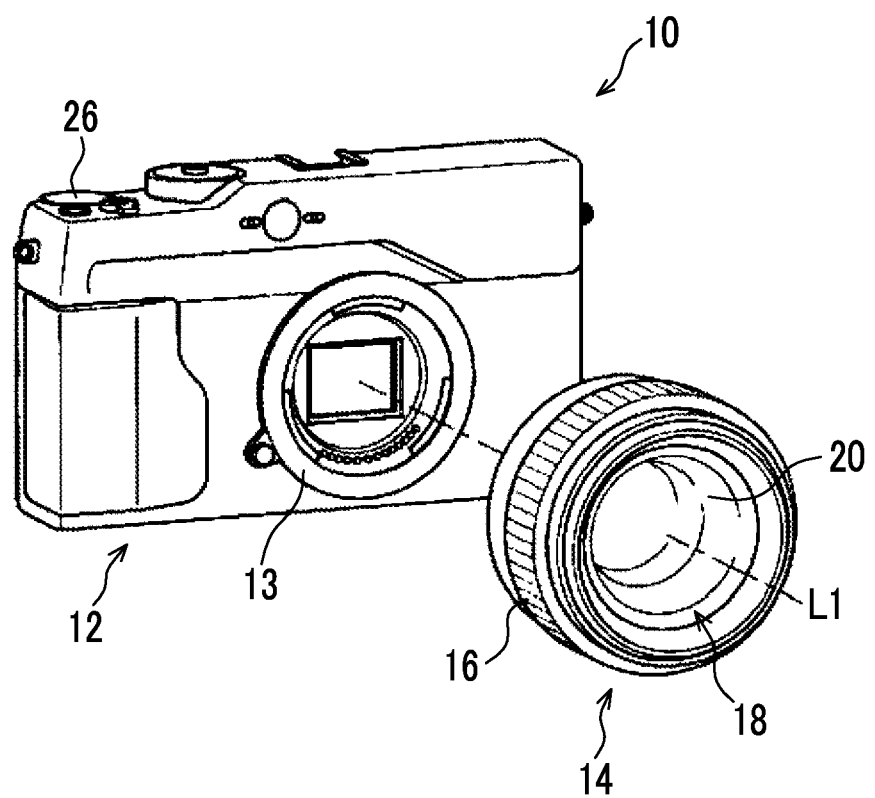
FIG. 1 is a perspective view showing an example of an appearance of an imaging apparatus according to a first embodiment which is one embodiment of the present invention.
Figure 2:
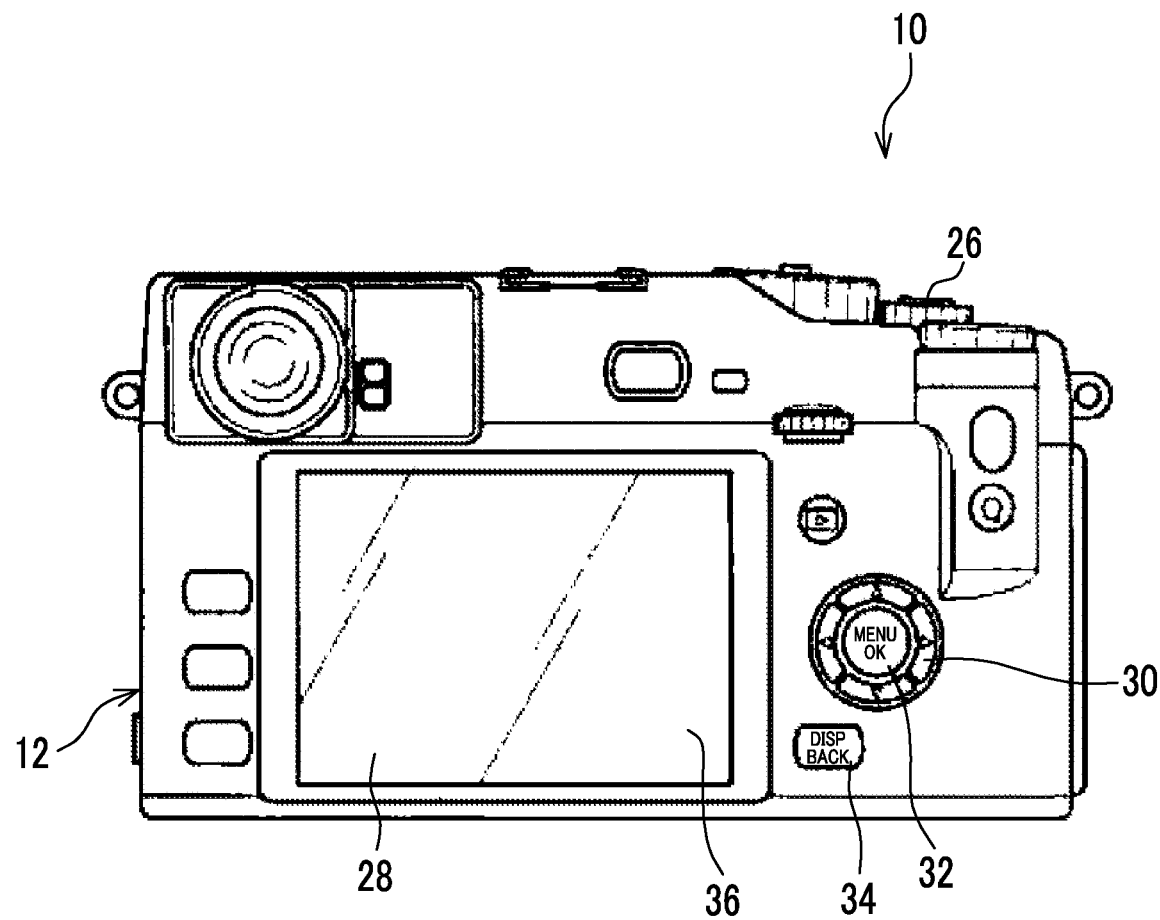
FIG. 2 is a rear view showing a rear side of the imaging apparatus according to the first embodiment which is one embodiment of the present invention.
Figure 3:
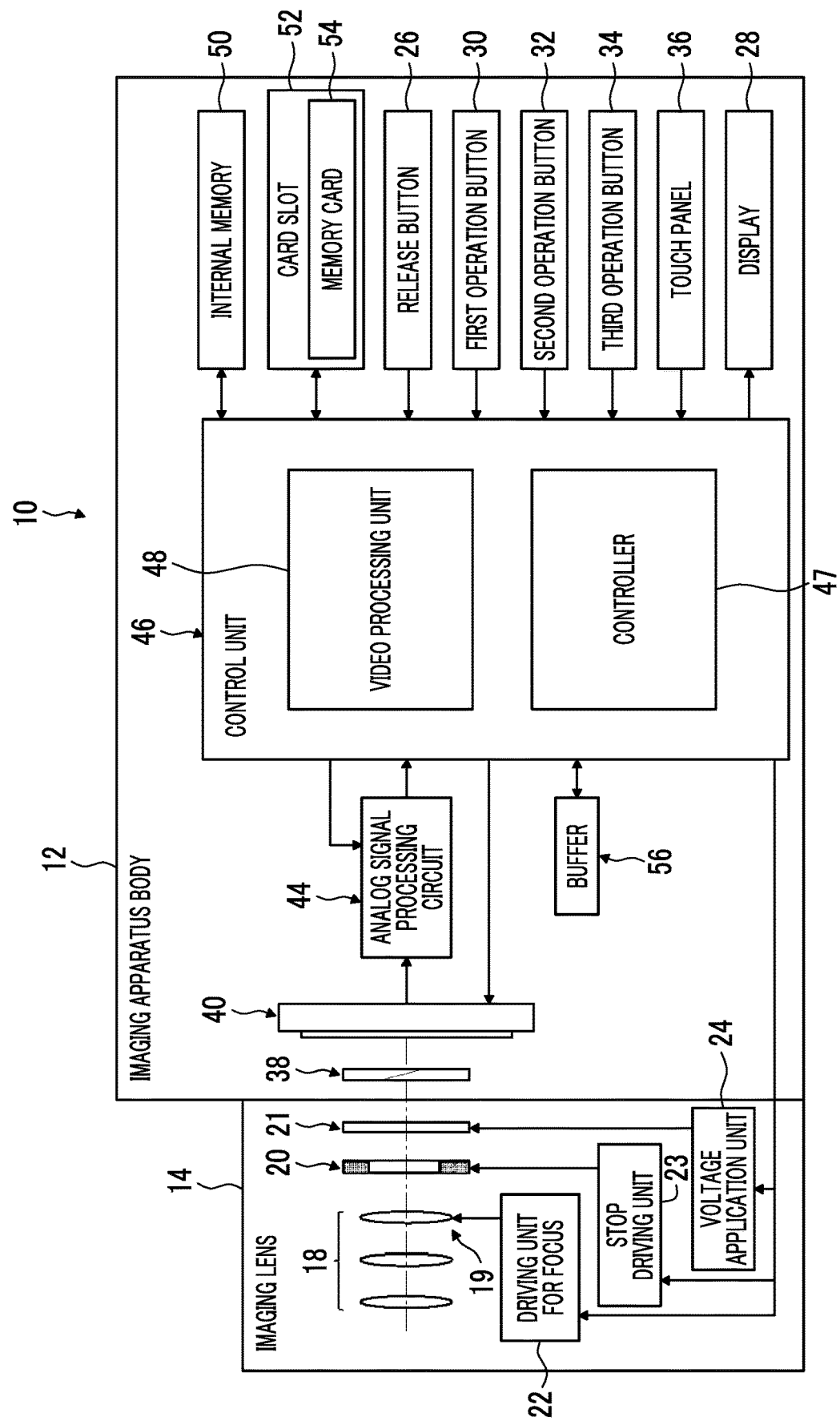
FIG. 3 is a block diagram showing a configuration of the imaging apparatus according to the first embodiment which is one embodiment of the present invention.

The first embodiment, which is one embodiment of the present invention, relates to a video creation method using an imaging apparatus 10 shown in FIGS. 1 to 3. FIGS. 1 and 2 show the appearance of the imaging apparatus 10, FIG. 1 is a perspective view of the imaging apparatus 10, and FIG. 2 is a rear view of the imaging apparatus 10 as viewed from the rear side. FIG. 3 is a block diagram showing a configuration of the imaging apparatus 10.

[Basic Configuration of Imaging Apparatus]

The imaging apparatus 10 is, for example, a digital camera and is used for video capturing. In the following description, the "video" means a live video (live view image), that is, a video captured in real time, unless otherwise specified.

The imaging apparatus 10 shown in FIGS. 1 and 2 is a lens-interchangeable digital camera, and comprises an imaging apparatus body 12 and an imaging lens 14. The imaging lens 14 is interchangeably attached to a mount 13 of the imaging apparatus body 12. It should be noted that the present invention is not limited to this, and the imaging apparatus 10 may be a lens-integrated digital camera.

(Imaging Lens)

As shown in FIG. 3, the imaging lens 14 includes an optical component unit 18, a stop 20, an electronic dimming filter 21, a driving unit for focus 22, a stop driving unit 23, and a voltage application unit 24.

The optical component unit 18 has a plurality of lenses, including an optical component for focus 19 (focus lens). In a case in which the optical component for focus 19 is moved in a direction of an optical axis L1, the focus of the imaging lens 14 is changed.

A focus adjustment mode includes a manual focus mode and an autofocus mode. In the manual focus mode, the optical component for focus 19 is moved in the direction of the optical axis L1 by a user manually turning a focus ring 16 provided on a lens barrel of the imaging lens 14.

In the autofocus mode, a control unit 46 described below drives the driving unit for focus 22 to move the optical component for focus 19 in the direction of the optical axis L1, so that the focus is automatically adjusted such that a subject in the video is focused.

A drive motor of the driving unit for focus 22 is composed of an ultrasound motor or the like, and is provided in the imaging apparatus body 12 or the imaging lens 14.

The optical component unit 18 includes a wide-angle lens, an ultra-wide-angle lens, a 360-degree lens, an anamorphic lens, or the like. As a result, the imaging apparatus 10 can capture the video with a wide angle of view in a horizontal direction. Here, the maximum angle of view (hereinafter referred to as a first angle of view) in a case in which the imaging apparatus 10 captures the video is determined in accordance with the use of the optical component unit 18 and an imaging element 40, which will be described below, and the video captured at the first angle of view corresponds to a "reference video" in one embodiment of the present invention.

It should be noted that the imaging apparatus 10 may comprise a plurality of optical component units 18 having different angles of view.

The stop 20 is an optical component that is disposed in an optical path of the imaging lens 14 and has a variable aperture shape, and adjusts the stop amount (specifically, a stop value or an F-number) for the incidence ray on the imaging lens 14. The stop 20 has an aperture shape that can be changed, for example, by mechanically driving a member for changing the size of the aperture. It should be noted that the present invention is not limited to this, and a stop (physical characteristic stop) in which the aperture shape can be changed by driving a liquid crystal display or an electrochromic element may be used.

The aperture shape of the stop 20, that is, the stop amount is adjusted by the stop driving unit 23.

The electronic dimming filter 21 is a neutral density (ND) filter that is disposed in the optical path of the imaging lens 14 and can change a dimming degree by an electronic method. The electronic dimming filter 21 is composed of, for example, a liquid crystal mixed with a dimming material that absorbs light, and changes the inclination of liquid crystal molecules to control the dimming degree (specifically, light transmittance).

It should be noted that the electronic dimming filter 21 is not limited to the liquid crystal type electronic ND filter, and may be a precipitation type electronic ND filter that uses an oxidation-reduction reaction of a reactant (for example, silver chloride). In addition, as the electronic dimming filter 21, for example, the electronic ND filter disclosed in JP2013-88596A or JP2019-68402A can be used.

The dimming degree of the electronic dimming filter 21 is adjusted by changing the magnitude of the voltage (applied voltage) applied to the electronic dimming filter 21 by the voltage application unit 24.

(Imaging Apparatus Body)

As shown in FIGS. 1 and 2, the imaging apparatus body 12 comprises an operating part operated by the user. For example, the release button 26 is disposed on an upper surface of the imaging apparatus body 12. For example, in a case in which the user fully presses the release button 26, the recording of the video captured by the imaging apparatus 10 or the video based on the captured video is started. Examples of the video based on the captured video include a video of a selection region, which will be described below. It should be noted that a release instruction (that is, a recording instruction) of the user may be input to the control unit 46 via a touch operation detection function of a display 28.

The display 28 constituting a display screen is disposed on the rear surface of the imaging apparatus body 12, and a plurality of buttons 30, 32, and 34 are disposed around the display 28.

The display 28 is composed of, for example, a liquid crystal display (LCD), an organic electroluminescence (EL) display, a light emitting diode (LED) display, or an electronic paper. On the display screen of the display 28, the video captured by the imaging apparatus 10 or the video based on the captured video is displayed.

In addition, on the display screen of the display 28, a selection menu relating to imaging conditions and the like, notification information to the user including warnings and the like, and a reproduced video of the video acquired in the past are further displayed.

Further, an insertion video Pi is displayed on the display screen of the display 28. The insertion video Pi is a video that is displayed for a certain period of time at a predetermined timing during the period in which the video is recorded. The insertion video Pi will be described below.

The display 28 has a function of detecting the touch operation of a user's finger. In addition, a transmissive touch panel 36 is superimposed on the display 28 or incorporated inside the display 28. The touch panel 36 detects a contact position of the user's finger or stylus pen and its displacement, and outputs a signal based on the detection result to a predetermined output destination. For example, the user touches the touch panel 36 with two fingers close to each other and then executes an operation of widening a distance between the fingers (so-called pinch-out operation). In this case, the touch panel 36 detects the positions of each of the two fingers at an operation start time and an operation termination time, and outputs a signal based on the detection result.

As shown in FIG. 3, a shutter 38, an imaging element 40, an analog signal processing circuit 44, the control unit 46, an internal memory 50, a card slot 52, and a buffer 56 are provided in a housing of the imaging apparatus body 12.

Figure 4:
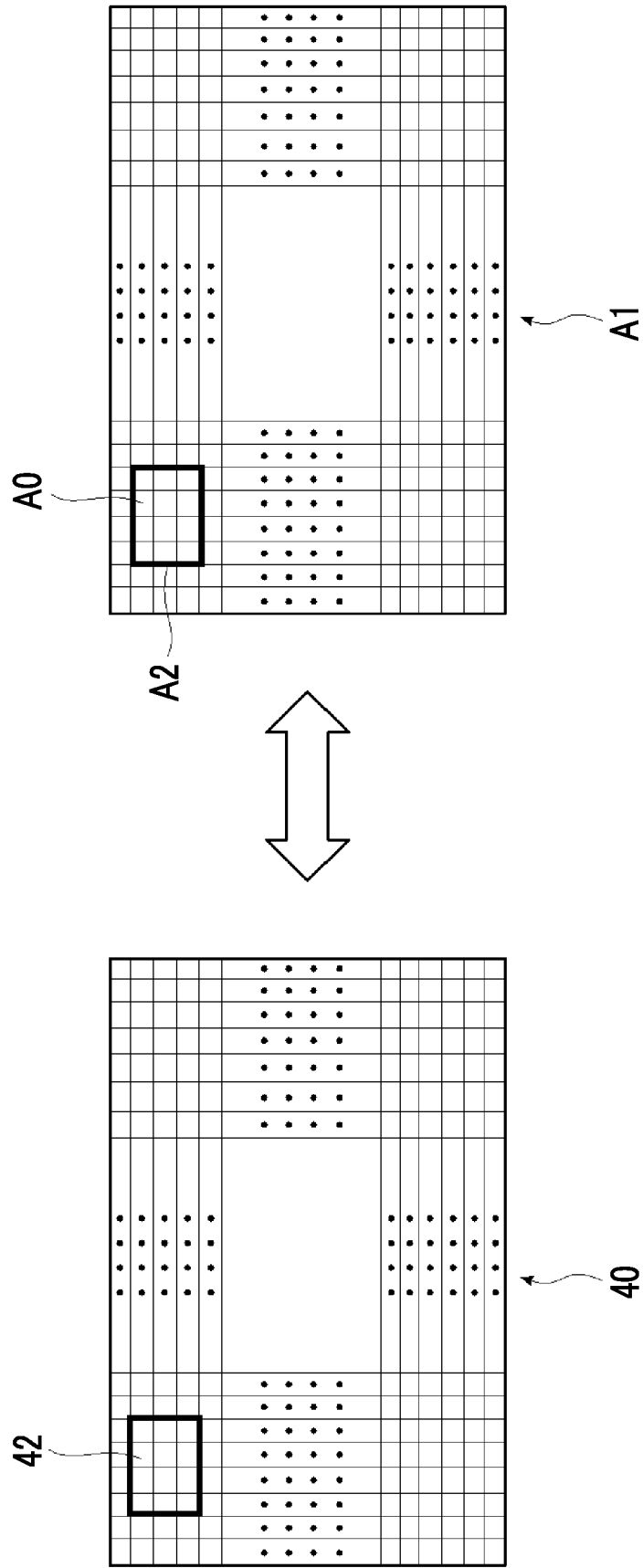
FIG. 4 is a diagram showing a correspondence relationship between pixels of the imaging element and an imaging region of a reference video.

The imaging element 40 is an image sensor, and is composed of a solid-state imaging element such as a charged coupled device (CCD) or a complementary metal oxide semiconductor imaging sensor (CMOS). The imaging element 40 has a plurality of pixels 42 arranged in a grid pattern as shown in FIG. 4. FIG. 4 shows a correspondence relationship between the pixels 42 of the imaging element 40 and the imaging region of the reference video.

Each pixel 42 includes an on-chip microlens, a color filter, and a photodiode (photoelectric conversion element).

In addition, each pixel 42 corresponds to one of unit regions A0 constituting an imaging region A1 of the video as shown in FIG. 4. The imaging region A1 is an imaging region in a case in which the imaging apparatus 10 captures the reference video, and an angle of view thereof corresponds to the first angle of view. The unit region A0 is a region forming the minimum unit in the imaging region A1 and is a region corresponding to the pixels 42 arranged in a vertical direction and the horizontal direction of the imaging element 40.

Stated another way, the reference video reflected in the imaging region A1 is composed of the same number of unit videos as the number of unit regions A0 (that is, the number of pixels 42). It should be noted that, in the present specification, the number of unit videos in the reference video is referred to as "the number of pixels" for convenience.

The imaging element 40 receives light from the subject which passes through the imaging lens 14, converts a received light image into an electric signal (image signal), and outputs the converted electric signal. In addition, the imaging element 40 is configured to execute an exposure operation using a so-called electronic shutter.

It should be noted that, in the following description, "exposure" means that the imaging element 40 executes exposure with the electronic shutter while the shutter 38 is maintained in an opened state, unless otherwise specified. In addition, the "exposure time" means a time corresponding to a shutter speed of the electronic shutter, strictly speaking, a charge accumulation time.

In the configuration shown in FIG. 3, the analog signal processing circuit 44 reads out the electric signal (image signal) for one frame output from the imaging element 40 for each pixel. The analog signal processing circuit 44 amplifies the read out image signal by an auto gain controller (AGC), and executes signal processing, such as sampling two correlation pile processing, on the amplified signal. The processed signal is transmitted to a video processing unit 48 of the control unit 46.

The control unit 46 controls each unit of the imaging apparatus 10 and executes various processes relating to the creation of the video file. As shown in FIG. 3, the control unit 46 includes a controller 47 and a video processing unit 48.

The control unit 46 is composed of, for example, one or a plurality of processors, and is composed of, for example, a central processing unit (CPU) and a control program. It should be noted that the present invention is not limited to this, and the processor described above may be composed of a field programmable gate array (FPGA), a digital signal processor (DSP), an application specific integrated circuit (ASIC), a graphics processing unit (GPU), a micro-processing unit (MPU), or other integrated circuits (ICs) or configured by combining these.

In addition, the processor described above may configure all functions of the control unit 46 including the controller 47 and the video processing unit 48 with one integrated circuit (IC) chip, as represented by system on chip (SoC).

It should be noted that the hardware configuration of the processor described above may be realized by an electric circuit (circuitry), in which circuit elements, such as semiconductor elements, are combined.

The controller 47 comprehensively controls the imaging apparatus 10 in accordance with the operation of the user or a defined control pattern. For example, the controller 47 controls the imaging element 40 and the analog signal processing circuit 44 to capture the video (motion picture) at a predetermined frame rate.

In addition, the controller 47 determines the imaging conditions in accordance with the imaging environment, and controls each driving unit, the imaging element 40, the analog signal processing circuit 44, and the video processing unit 48 such that the conditions become the determined imaging conditions. The imaging conditions include the exposure amount in a case in which the video is captured, the white balance, the focus of the imaging lens 14, and the like.

Further, the controller 47 controls the video processing unit 48 such that the captured video or the video based on the captured video is recorded on a recording medium.

The video processing unit 48 converts the signal transmitted from the analog signal processing circuit 44 into digital image data, and then executes various processes, such as gamma correction, white balance correction, and scratch correction, on the digital image data. In addition, the video processing unit 48 compresses the processed digital image data in a compression format conforming to a predetermined standard.

Moreover, the video processing unit 48 generates the compressed digital image data at a specific frame rate while capturing the video, and acquires the video (strictly speaking, frame image) from the data. The video (frame image) acquired in this case corresponds to the video captured at the first angle of view, that is, the reference video.

In addition, the video processing unit 48 executes various processes (for example, extraction process which will be described below) on the acquired video under the control of the controller 47, and outputs the processed video at a specific frame rate for each frame to the display 28.

Further, the video processing unit 48 records the processed video on the recording medium and creates the video file thereof. As described above, the video processing unit 48 has a function of creating the video file, and the imaging apparatus 10 including the video processing unit 48 is used as a video creation apparatus.

It should be noted that, in the following, unless otherwise specified, the operation and process of each of the controller 47 and the video processing unit 48 will be described as the operation and process of the control unit 46. In addition, the process by the control unit 46 will be described below in detail.

The internal memory 50 built in the imaging apparatus body 12 and a memory card 54 that can be attached to and detached from the imaging apparatus body 12 via the card slot 52 are recording media, and the video is recorded on the recording medium by the control unit 46. The internal memory 50 and the memory card 54 are composed of a flash memory, a ferroelectric memory, or the like. It should be noted that the internal memory 50 and the memory card 54 may be outside the imaging apparatus body 12, and in that case, the control unit 46 may record the video on an external recording medium by wire or wirelessly.

The buffer 56 functions as a work memory of the control unit 46, and is composed of, for example, a dynamic random access memory (DRAM), a ferroelectric memory, or the like.

[Process by Control Unit]

The process by the control unit 46 includes a display process, an extraction process, a selection process, a switching process, a recording process, an exposure amount adjustment process, a focus adjustment process, and a white balance adjustment process.

In the following, each of the processes described above will be described individually.

(Display Process)

The display process is a process of displaying various videos on the display screen of the display 28. For example, in a case in which the control unit 46 starts the display process after the imaging apparatus 10 is activated, at that time, the reference video captured by the imaging apparatus 10 at the first angle of view, that is, the video reflected in the imaging region A1 shown in FIG. 4 is displayed.

In addition, in a case in which the extraction process is executed, the control unit 46 displays the video of the selection region, which will be described below, on the display screen. Further, in a case in which the selection region is switched (that is, in a case in which a switching step, which will be described below, is executed), the control unit 46 displays the insertion video Pi described below on the display screen, and then displays the video of the selection region after the switching step.

The execution operation of the display process by the control unit 46 as described above corresponds to a display step. It should be noted that, in the present embodiment, the video displayed on the display 28 by the display process is a live video (live view image) captured in real time at that time.

(Extraction Process)

The extraction process is a process of extracting a part of the reference video. The extracted video is also called a crop video (cut-out video) and is a recording target in the recording process.

Figure 5:
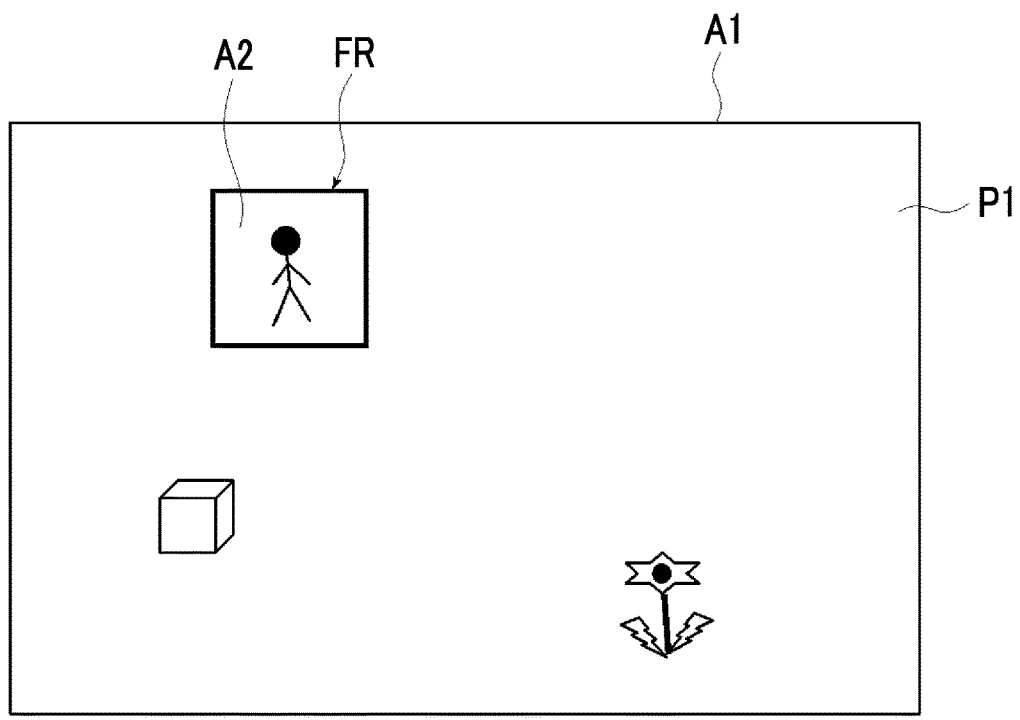
FIG. 5 is a diagram showing a procedure of setting a region of a video extracted from the reference video.

In the extraction process, the user executes an operation for setting the region to be extracted in the imaging region of the reference video. The setting operation will be specifically described with reference to FIG. 5. FIG. 5 shows a procedure of setting the region of the video extracted from the reference video.

As shown in FIG. 5, the user executes the setting operation in a state in which the reference video (denoted as the symbol P1 in FIG. 5) is displayed on the display screen of the display 28. Specifically, in a case in which the user executes a predetermined button operation while the reference video P1 is displayed, a rectangular region setting frame FR is superimposed and displayed on the reference video P1 as shown in FIG. 5. A region A2 surrounded by the region setting frame FR is the region of the video extracted from the reference video P1. The angle of view of the extracted video is smaller than the angle of view of the reference video P1, that is, the first angle of view, and is hereinafter referred to as a second angle of view.

The region setting frame FR is displayed in a state in which its position, size, and aspect ratio are variable. For example, the user touches one side of the region setting frame FR on the touch panel 36 with a finger and drags the finger to change a display position of the region setting frame FR. In addition, the size and aspect ratio of the region setting frame FR can be changed by the user touching the region setting frame FR on the touch panel 36 with two fingers and widening or narrowing the distance between the fingers. By changing the position, size, and aspect ratio of the region setting frame FR in this way, the position, size, and aspect ratio of the region of the video extracted from the reference video P1 can be changed.

Figure 6:
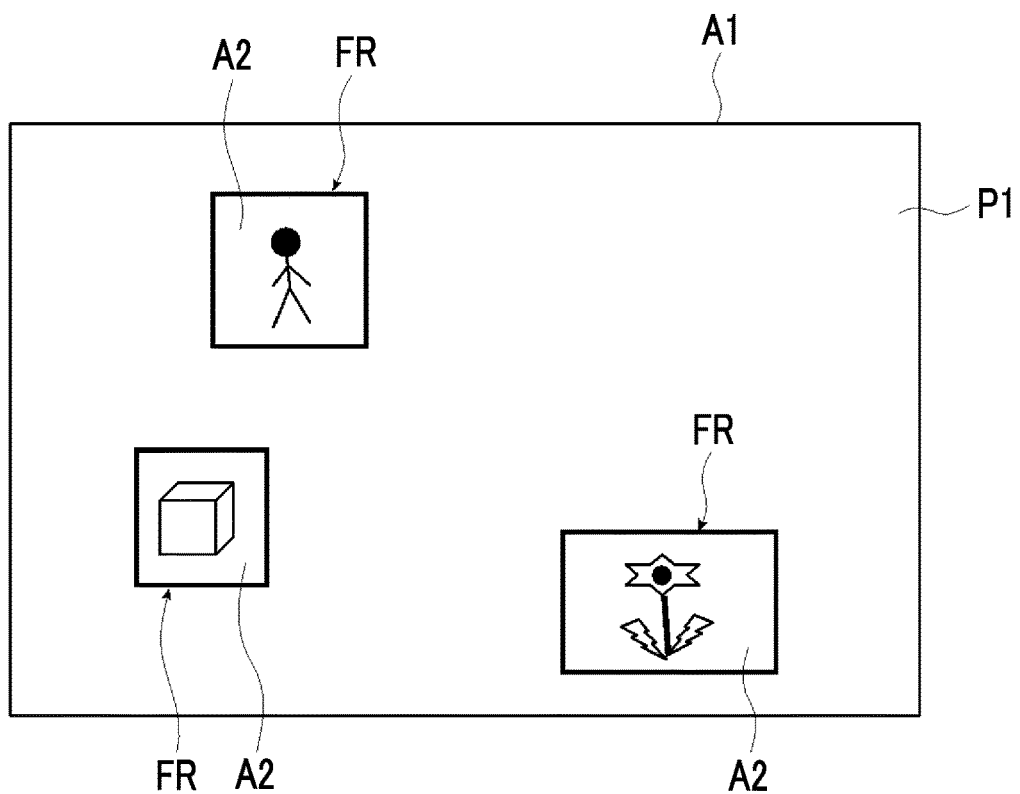
FIG. 6 is a diagram showing a state in which a plurality of regions of the video extracted from the reference video are set.

The operation described above corresponds to the setting operation by the user. In addition, by repeating a series of operations described above a plurality of times, as shown in FIG. 6, a plurality of regions A2 of the extracted video can be set in the imaging region A1 of one reference video P1. FIG. 6 shows a state in which the plurality of regions A2 of the video extracted from the reference video P1 are set.

It should be noted that, in a case in which the plurality of regions A2 are set, the size (second angle of view) of each region A2 may be the same as other regions A2 or may vary between the regions A2.

In addition, the shape of each region A2 is not limited to a rectangle (rectangle), and may be a square, a parallelogram, a trapezoid, a rhombus, a circle or an ellipse, a polygon of a triangle or a pentagon or more, or an indefinite shape.

In addition, the number of regions A2 to be set is not particularly limited, but in the present embodiment, the number of regions A2 is two or more as shown in FIG. 6.

In a case in which the setting operation by the user is repeated a plurality of times, the control unit 46 receives each setting operation and sets the regions A2 corresponding to the number of setting operations in the imaging region A1 of the reference video P1. Such an operation of the control unit 46 corresponds to a setting step.

It should be noted that, in a case in which the reference video P1 is a high-quality video (for example, a video having 10 million or more pixels), the video of the second angle of view extracted from the reference video P1 is a sufficiently high-quality video.

The number of pixels of the reference video P1 is not particularly limited, but a lower limit thereof is preferably 10 million or more, and more preferably 60 million or more. In addition, an upper limit of the number of pixels is preferably 1 billion or less, and more preferably 500 million or less. In a case in which the number of pixels exceeds the lower limit described above, the visibility of the video of the second angle of view extracted from the reference video P1 is guaranteed. In a case in which the number of pixels is less than the upper limit described above, the amount of data in the reference video P1 is reduced, and a process speed by the control unit 46 is increased.

(Selection Process and Switching Process)

The selection process is a process of selecting the selection region in which the recorded video is reflected from among the plurality of regions A2 set in the imaging region A1 of the reference video P1.

The switching process is a process of reselecting the selection region from among the plurality of regions A2 to switch the selection region after the selection process.

It should be noted that, in the present embodiment, the number of regions to be selected in the selection process and the switching process is one, but the number of regions is not limited to this, and two or more regions may be selection regions.

The procedure of the selection process and the switching process will be described. The user executes the setting operation described above to set the plurality of regions A2, and then selects any of the regions A2 as the selection region. Thereafter, the region A2 selected by the user through the operation buttons 30, 32, and 34, the touch panel 36, or the like is input, and the input operation is received by the control unit 46. The control unit 46 determines the selection region from among the plurality of regions A2 based on the input operation of the user. Such an operation by the control unit 46 corresponds to a selection step.

In addition, after the selection step, in a case in which the user reselects the selection region to another region A2 and executes the input operation again, the control unit 46 receives a re-input operation and switches the selection region up to the current time to another region A2 based on the re-input operation. Such an operation by the control unit 46 corresponds to a switching step.

It should be noted that the input operation (re-input operation) executed in a case in which the user reselects the selection region is not particularly limited. For example, the re-input operation may be an operation of tapping the region A2 to be selected on the display 28, or may be an operation of pressing down any of an up/down button or a right/left button of the first operation button 30 which is a cross key.

Figure 7:
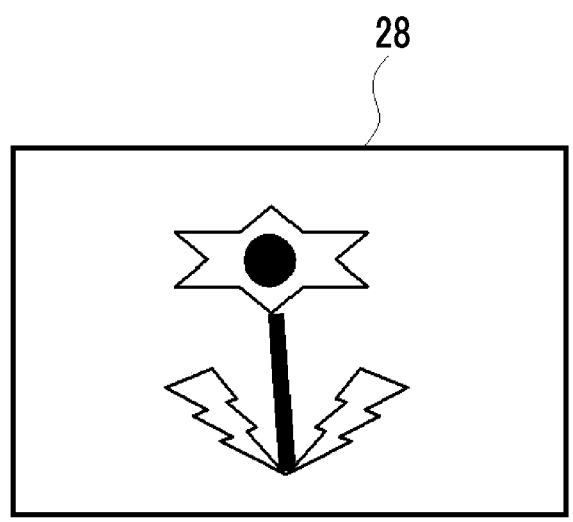
FIG. 7 is a diagram showing a video of a selection region displayed on a display screen.

As described above, in the present embodiment, the selection region is selected from among the plurality of regions A2 in the selection step, and the video of the selection region is recorded as the video file. In addition, in a case in which the selection step is executed, the video of the selection region is displayed on the display screen of the display 28 as shown in FIG. 7 in conjunction with the selection step. FIG. 7 shows the video of the selection region displayed on the display screen.

In addition, by executing the switching step after the selection step, the selection region can be switched and the video which is the recording target can be changed from the video of a certain subject to the video of another subject. As a result, for each of a plurality of subjects in the same scene (same place), individual videos (specifically, videos close up to each subject) can be simultaneously captured by one imaging apparatus 10 without using a plurality of apparatuses.

In addition, the region A2 in which the recorded video is reflected can be switched (switched) in time series in accordance with the operation of the user, and the video file in which the video before and after the switching is reflected can be easily acquired.

Further, in conjunction with the execution of the switching step, the video displayed on the display screen of the display 28 is switched from the video of the selection region before the switching step to the video of the selection region after the switching step. That is, in a case in which the control unit 46 executes the switching step during the display step, in the display step, the video of the selection region before the switching step is displayed, and then the video of the selection region after the switching step is displayed. As a result, the user can confirm the switching of the selection region on the display screen.

It should be noted that, in the following, the video of the selection region after the switching step will be referred to as a post-switching video Pa, and the video of the selection region before the switching step will be referred to as a pre-switching video Pb.

Figure 8:
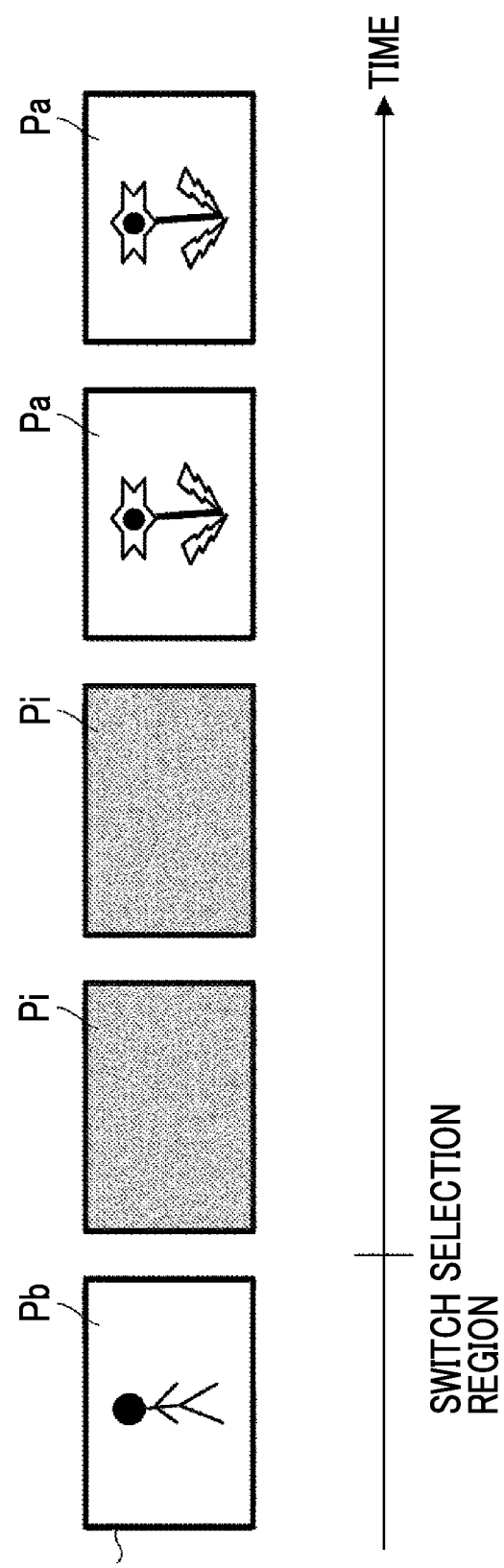
FIG. 8 is an explanatory diagram of a transition of a display video accompanied by the execution of a switching step.

Furthermore, in a case in which the switching step is executed during the display step, as shown in FIG. 8, the control unit 46 displays the insertion video Pi in the period between a display period of the pre-switching video Pb and a display period of the post-switching video Pa in the display step. FIG. 8 is an explanatory diagram of a transition of the display video accompanied by the execution of the switching step.

The insertion video Pi is, for example, a video based on none of the reference video, the pre-switching video Pb, and the post-switching video Pa. For example, a video filled with a single color (for example, black or gray) as shown in FIG. 8. In addition, a video prepared in advance (for example, a landscape video or a portrait video provided as a sample video) can also be used as the insertion video Pi.

It should be noted that the insertion video Pi is not limited to the video described above, and may be, for example, a video based on at least one of the post-switching video Pa or the pre-switching video Pb. For example, a video that gradually transitions (crossfades) from the pre-switching video Pb to the post-switching video Pa may be created, and the video may be displayed as the insertion video Pi. In addition, the insertion video Pi may be a still picture relating to the pre-switching video Pb.

(Recording Process)

The recording process is a process in which the control unit 46 records the video of the selection region on the recording medium to create the video file (specifically, motion picture file) relating to the video. The operation of the control unit 46 to record the video of the selection region in the recording process corresponds to a recording step.

Figure 9:
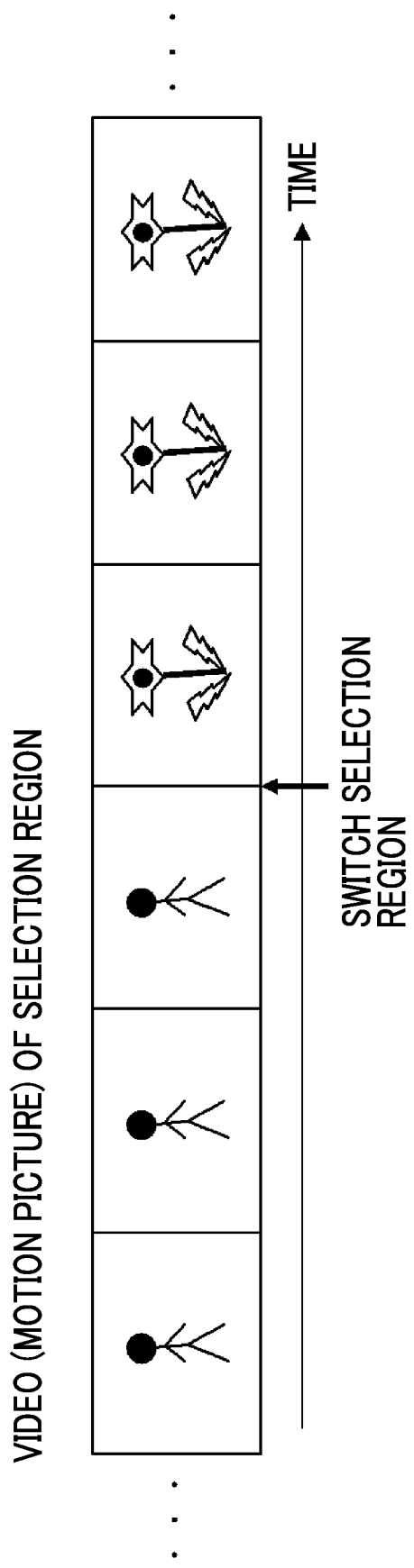
FIG. 9 is an explanatory diagram of a motion picture file of a recorded video.

In addition, in a case in which the switching step is executed, the control unit 46 records each of the pre-switching video Pb and the post-switching video Pa in the recording step to create the video file. Specifically, in the recording step, the control unit 46 combines a motion picture which is the pre-switching video Pb and the motion picture which is the post-switching video Pa to create the motion picture file as the video file. As a result, as shown in FIG. 9, the motion picture file of the video in which the subject is changed by switching the selection region is acquired. FIG. 9 is an explanatory diagram of the motion picture file of the recorded video.

It should be noted that, as shown in FIG. 9, the video recorded in the recording step is the video of the selection region, and in a case in which the switching step is executed, the pre-switching video Pb and the post-switching video Pa are recorded. On the other hand, since the insertion video Pi is not a video that is recorded to be used later, the insertion video Pi is excluded from the recording target in the recording step. As a result, it is possible to appropriately create the video file (motion picture file) such that only the video reflecting the subject as shown in FIG. 9 is recorded.

(Exposure Amount Adjustment Process)

The exposure amount adjustment process is a process of adjusting the exposure amount of the selection region, and is executed by using an automatic exposure (AE) function of the control unit 46. The operation of the control unit 46 in the exposure amount adjustment process corresponds to an example of an adjustment step of one embodiment of the present invention.

The exposure amount is determined by a plurality of parameters including the exposure time (that is, the shutter speed of the electronic shutter), the sensitivity (ISO sensitivity) of the pixel 42 included in the imaging element 40, and the stop amount (F-number) of the incidence ray on the imaging lens 14. The exposure amount is adjusted by determining the value of each parameter and controlling the stop driving unit 23, the imaging element 40, the video processing unit 48, and the like such that each parameter becomes the determined value. Here, the adjustment of the stop 20 by the stop driving unit 23 is executed by using a known automatic light control (ALC) function. In addition, the adjustment of the shutter speed of the electronic shutter in the imaging element 40 is executed by using a known electronic light control (ELC) function.

In a case in which the imaging lens 14 includes the electronic dimming filter 21, the dimming degree of the electronic dimming filter 21 is included in the plurality of parameters. In this case, the exposure amount is adjusted by determining the value of the dimming degree of the electronic dimming filter 21 and controlling the voltage application unit 24 such that the dimming degree becomes the determined value.

By the way, an appropriate value (appropriate exposure amount) of the exposure amount of the selection region is changed in accordance with the region, which is the selection region among the plurality of regions A2 set in the imaging region A1 of the reference video P1.

More specifically, in a case in which the reference video P1 is captured, the exposure amount in each portion of the imaging region A1 including the plurality of regions A2 is changed in accordance with the subject and the environment in each portion. That is, since an appropriate exposure amount of each region A2 in the imaging region A1 can be changed in accordance with the position of the region A2, the appropriate exposure amount is determined for each region A2.

The appropriate exposure amount of each region A2 is determined by a known procedure. As an example, from the image signal output from the pixel 42 corresponding to the unit region A0 constituting a certain region A2 in the imaging element 40, the brightness of red (R), green (G), and blue (B) (that is, RGB pixel value) is integrated for the region A2. Here, the pixel 42 corresponding to the unit region A0 is the pixel 42 at the same arrangement position as the unit region A0 in a positional relationship shown in FIG. 4. For example, in FIG. 4, the unit region A0 in the region A2 surrounded by a thick frame corresponds to the pixel 42 in a range surrounded by the thick frame in FIG. 4. Moreover, the appropriate exposure amount of the region A2 is captured is determined from the integrated value of the RGB pixel values calculated for the region A2 (specifically, average value in the region A2).

The exposure amount of the selection region is adjusted based on the appropriate exposure amount determined as described above. Specifically, the control unit 46 determines the value of each of the exposure time (shutter speed), the stop amount (F-number), and the sensitivity (ISO sensitivity) of the pixel 42 based on the appropriate exposure amount in a predetermined region.

It should be noted that, regarding the sensitivity (ISO sensitivity), the gain (amplification ratio) for the output signal from the pixel 42 corresponding to the selection region is determined Here, the gain may be, for example, the analog gain for the analog signal in the analog signal processing circuit 44 or the like, or the digital gain for the signal (data) after digital conversion in the video processing unit 48 or the like.

Moreover, after the exposure time, the stop amount, and the sensitivity are determined, the control unit 46 controls the stop driving unit 23, the imaging element 40, the video processing unit 48, and the like such that these parameters become the determined values. As a result, the exposure amount in a case in which the reference video including the video of the selection region is captured is adjusted to be a target exposure amount.

While the video is recorded, the exposure amount adjustment process is periodically (for example, for each frame) and repeatedly executed by the procedure described above. Moreover, the target exposure amount is set each time the exposure amount adjustment process is executed, and the exposure time, the stop amount, and the sensitivity value are determined in accordance with the target exposure amount.

Specifically, while the video is captured, the integrated value of the RGB pixel values in the selection region in an Nth frame image (N is a natural number) is obtained. Thereafter, the appropriate exposure amount is calculated based on the obtained integrated value, and the target exposure amount is set from the calculated appropriate exposure amount. Moreover, the exposure time, the stop amount, and the sensitivity in a case in which the subsequent (that is, the N+1 th) frame image is captured are determined in accordance with the set target exposure amount.

In addition, by executing the exposure amount adjustment process for each frame, the exposure conditions (exposure time, stop amount, and sensitivity) are chronologically changed, and the exposure amount of the selection region is chronologically adjusted accordingly. Here, the "chronological adjustment" means that the adjustment amount is determined for each frame for the parameter that is an adjustment target, and each parameter is increased or decreased by the adjustment amount for each frame.

Incidentally, in the present embodiment, a mode for adjusting the exposure amount includes a manual adjustment mode in which the user manually adjusts the exposure amount, in addition to an auto adjustment mode in which the exposure amount is automatically adjusted as described above. In the manual adjustment mode, the user operates various operation buttons 30, 32, and 34 or the touch panel 36 to input the set values of the parameters (exposure time, stop amount, sensitivity, and the like) described above. Moreover, the control unit 46 controls the stop driving unit 23, the imaging element 40, the video processing unit 48, and the like such that each parameter becomes the set value input by the user.

(Focus Adjustment Process)

The focus adjustment process is a process in which the control unit 46 controls the driving unit for focus 22 in the autofocus mode to automatically adjust the focus of the imaging lens 14. The operation of the control unit 46 in the focus adjustment process corresponds to an example of an adjustment step of one embodiment of the present invention.

A known autofocus technique can be used for the focus adjustment in the autofocus mode. Specific examples thereof include contrast autofocus, image plane phase difference autofocus, directional light beam autofocus, and depth-from-defocus method (DFD method) autofocus.

It should be noted that the directional light beam autofocus is a method of irradiating the subject with light and receiving the reflected light to measure the distance to the subject and adjust the focus. Examples of the directional light beam autofocus include laser autofocus and autofocus using time of flight (ToF) technique.

In addition, as the DFD method autofocus, for example, the techniques disclosed in JP2014-98898A or JP2015-200907A can be used.

As the autofocus, any one of the methods described above may be adopted, or a plurality of methods may be combined and adopted. In the latter case, the contrast autofocus is a first method, and any method selected from among the image plane phase difference autofocus, the directional light beam autofocus, or the DFD method autofocus is a second method. Moreover, both the first method and the second method may be adopted, and these methods may be used appropriately in accordance with a situation in a case of focus adjustment (for example, the type or brightness of the light source).

It should be noted that, in the present embodiment, the first method and the second method are used in combination, and the second method is the image plane phase difference autofocus. Here, the image plane phase difference autofocus is the autofocus method having the fastest focus adjustment speed among the methods described above, although the adjustment accuracy is decreased in a case in which the stop value (F-number) is large.

(White Balance Adjustment Process)

The white balance adjustment process is a process of automatically adjusting the white balance of the video of the selection region by the control unit 46. The white balance adjustment process is executed using a known auto white balance (AWB) function, for example, a technique disclosed in JP2009-33410A. It should be noted that the operation of the control unit 46 in the white balance adjustment process corresponds to an example of an adjustment step of one embodiment of the present invention.

[Regarding Adjustment Step]

In a case in which the selection step or the switching step is executed, the control unit 46 executes the adjustment step in conjunction with the selection step or the switching step. In the adjustment step, at least one of the exposure amount of the selection region, the focus of the imaging lens 14, or the white balance of the video of the selection region is adjusted. In particular, in the adjustment step after the switching step is executed, at least one of the exposure amount of the selection region after the switching step, the white balance of the post-switching video Pa, or the focus of the imaging lens 14 after the switching step is adjusted. In this case, the exposure amount of the selection region and the like are adjusted during the display period of the insertion video Pi.

As described above, in the first embodiment, the insertion video Pi is displayed, and the exposure amount of the selection region and the like are adjusted by using the display period. As a result, it is not necessary to display the video of the selection region (that is, the post-switching video Pa) in a stage in which the adjustment of the exposure amount or the like is in progress. Therefore, it is possible to avoid a situation in which the discomfort is given to the user by displaying the video in a state in which the adjustment is not completed. It should be noted that the adjustment step does not have to be completed during the display period of the insertion video Pi, and in that case, the adjustment step may be executed during the display period of the post-switching video. Even in such an embodiment, since the post-switching video Pa can be displayed in a state in which the exposure amount adjustment progresses to some extent, it is possible to alleviate the discomfort given to the user.

It should be noted that, in the following, as an example, a case will be described in which the exposure amount, the focus, and the white balance are adjusted in the adjustment step. It should be noted that the present invention is not limited to this, and any of the exposure amount, the focus, or the white balance may be adjusted. In such a case, the user may be able to freely select an item to be automatically adjusted (optimized) by the control unit 46 in the adjustment step from the three items described above. In this case, for the items not selected by the user, the adjustment (optimization) may be made for the entire imaging region (that is, first angle of view) of the reference video regardless of which region A2 is the selection region.

Regarding Flow of Video Creation According to First Embodiment

Figure 10:
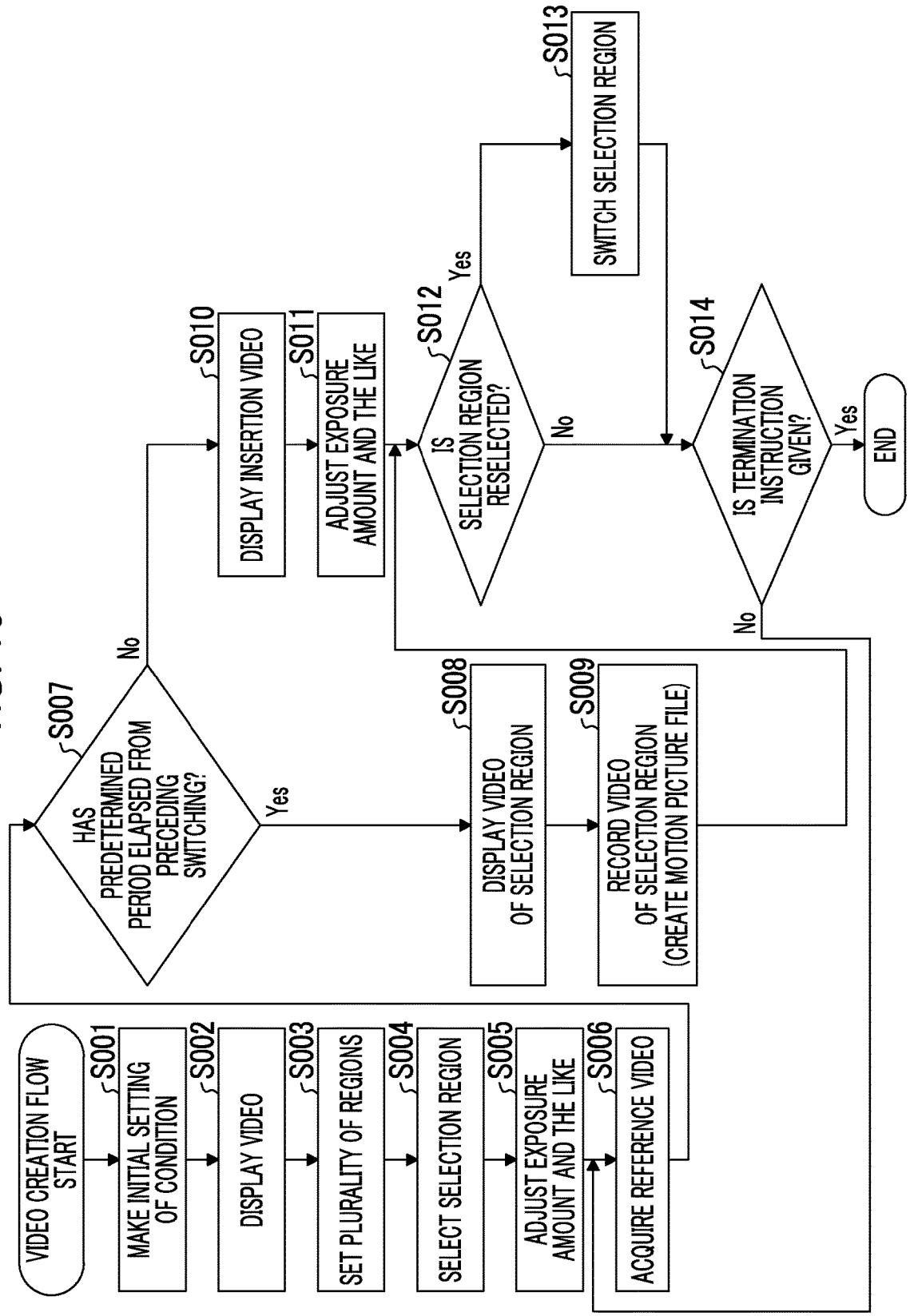
FIG. 10 is an explanatory diagram of a video creation flow according to the first embodiment which is one embodiment of the present invention.

A flow of the video creation according to the first embodiment will be described with reference to FIG. 10. FIG. 10 is an explanatory diagram of a video creation flow according to the first embodiment.

It should be noted that, in the following, for convenience, a period for capturing one reference video (frame image) will be referred to as "one frame".

In the video creation flow, the user first activates the imaging apparatus 10. After the device is activated, the control unit 46 makes initial settings of various conditions including imaging condition and the exposure condition (S001). In this step S001, each of the plurality of parameters that determine the exposure amount, such as the exposure time (shutter speed), the stop value (F-number), and the sensitivity (ISO sensitivity), is preset to an initial value. Similarly, in step S001, the focus, the white balance, and the like of the imaging lens 14 are preset in accordance with the imaging environment and the like as the imaging conditions in a case in which the video is captured.

Thereafter, video capturing at the first angle of view (that is, capturing of the reference video) by the imaging apparatus 10 is started. In conjunction with the start of the video capturing, the display step by the control unit 46 is executed, and the reference video, which is the live video, is displayed on the display screen of the display 28 (S002).

The user executes the setting operation described above a plurality of times, and the control unit 46 receives each setting operation to execute the setting step (S003). In this step S003, the control unit 46 sets the plurality of regions A2 in the imaging region A1 of the reference video in accordance with the setting operation executed by the user through the reference video displayed on the display screen.

In addition, in a case in which the user selects the selection region from among the plurality of regions A2 and inputs the selection result through the touch panel 36 or the like, the control unit 46 executes the selection step (S004). In this step S004, the control unit 46 selects the selection region from among the plurality of regions A2 in accordance with the input operation of the user.

After the selection region is selected, the control unit 46 adjusts the exposure amount, the focus, and the white balance for the selection region (S005).

Thereafter, in a case in which the user executes the operation, such as pressing the release button 26, to start recording of the video, step S006 and the subsequent steps are executed.

First, in step S006, the control unit 46 acquires the reference video (that is, frame image) for one frame. In subsequent step S007, the control unit 46 determines whether or not a predetermined time has elapsed from the preceding switching of the selection region at the current time (current frame). Here, in a case in which the switching step is not executed in preceding frame, for example, in a case of the first frame, it is determined as "Yes (predetermined time has elapsed)" in step S007.

In a case in which it is determined in step S007 that "Yes (predetermined time has elapsed)", in step S008, the control unit 46 executes the display step and displays the video of the selection region on the display screen of the display 28. In addition, in step S009, the control unit 46 executes the recording step to record the video of the selection region on the recording medium and start the creation of the motion picture file which is the video file. The video of the selection region displayed and recorded in this case is a video in which the exposure amount, the focus, and the white balance are adjusted in step S005 or step S011 described below.

In addition, in a case in which the user selects the selection region once, then reselects the selection region and executes the input operation again (S012), the control unit 46 executes the switching step (S013). In step S013, the control unit 46 reselects and switches the selection region from among the plurality of regions A2 in accordance with the input operation of the user. Thereafter, the process returns to step S006, and step S006 and the subsequent steps are repeated.

In a case in which the switching step is executed, the control unit 46 executes the display step to display the insertion video Pi on the display screen in a period from the execution time until the predetermined time elapses (that is, in a case in which it is determined as "No" in S007) (S010). In addition, the control unit 46 executes the adjustment step using the display period of the insertion video Pi (S011). In such an adjustment step, the exposure amount of the selection region after the switching step, the white balance of the post-switching video Pa, or the focus of the imaging lens 14 after the switching step are adjusted. It should be noted that, in the first embodiment, the control unit 46 interrupts the recording of the video during the display period of the insertion video Pi. It should be noted that the present invention is not limited to this, and the control unit 46 may continue to record the video even during the display period of the insertion video Pi, that is, may create the motion picture file including the insertion video Pi.

In the first embodiment, a length (time) of the display period of the insertion video Pi is predetermined based on the required time for adjusting the exposure amount and the like in step S011. Here, the required time for adjustment may be changed in accordance with the content of adjustment, the adjustment method, and the like. For example, in a case in which the image plane phase difference autofocus is adopted in a case of adjusting the focus, the required time for the adjustment is shorter than in a case in which the contrast autofocus is adopted. In consideration of the points described above, in a case in which the length of the display period of the insertion video Pi is determined, it is preferable to determine the length in accordance with the adjustment content, the adjustment method, and the like.

In addition, as described above, the insertion video Pi may be a single black or gray image, or may be a crossfade video transitioning from the pre-switching video Pb to the post-switching video Pa. In a case in which the crossfade video is displayed, a transition speed of the video may be determined based on the required time for adjusting the exposure amount and the like in step S011. Here, the transition speed of the video is a value indicating a degree (increasing speed) in which a ratio of the region occupied by the post-switching video Pa in the crossfade video is increased per unit time.

Moreover, after a predetermined time (that is, the display period of the insertion video Pi) has elapsed since the preceding switching step is executed, the display of the insertion video Pi ends and the post-switching video Pa is displayed (that is, the insertion video Pi is displayed) (S008). The post-switching video Pa displayed in this case is a video in a state in which the adjustment of the exposure amount or the like is completed for the post-switching selection region. It should be noted that the control unit 46 may display the post-post-switching video Pa as long as the adjustment of the exposure amount and the like for the post-switching selection region is substantially completed.

In addition, at the time when the predetermined time (that is, the display period of the insertion video Pi) has elapsed from the preceding switching step, the recording step that had been interrupted until then is restarted (S009). In the restarted recording step, the post-switching video Pa is recorded on the recording medium. In this case, the post-switching video Pa and the pre-switching video Pb are combined to create the motion picture file. In addition, as described above, the insertion video Pi is excluded from the recording target. In the motion picture file created in this way, as shown in FIG. 9, the pre-switching video Pb is immediately switched (switched) to the post-switching video Pa.

The control unit 46 repeats a series of steps S006 to S013 described above until the user executes the predetermined operation and gives a termination instruction (S014). Moreover, the video creation flow is terminated at the time when the user gives the termination instruction.

As described above, in the present embodiment, in a case in which the exposure amount or the like is adjusted along with the switching of the selection region, the insertion video Pi is displayed as a dummy video after the selection region is switched. That is, in the present embodiment, the insertion video Pi is displayed in the period between the display period of the pre-switching video Pb and the display period of the post-switching video Pa (strictly speaking, the post-switching video Pa in which the exposure amount or the like is adjusted). As a result, the post-switching video Pa is not displayed in the stage in which the adjustment of the exposure amount or the like is in progress, and the post-switching video Pa in this stage cannot be shown to the user.

Second Embodiment

In the first embodiment, the insertion video Pi is displayed only for the predetermined period after the switching step is executed.

Figure 11:
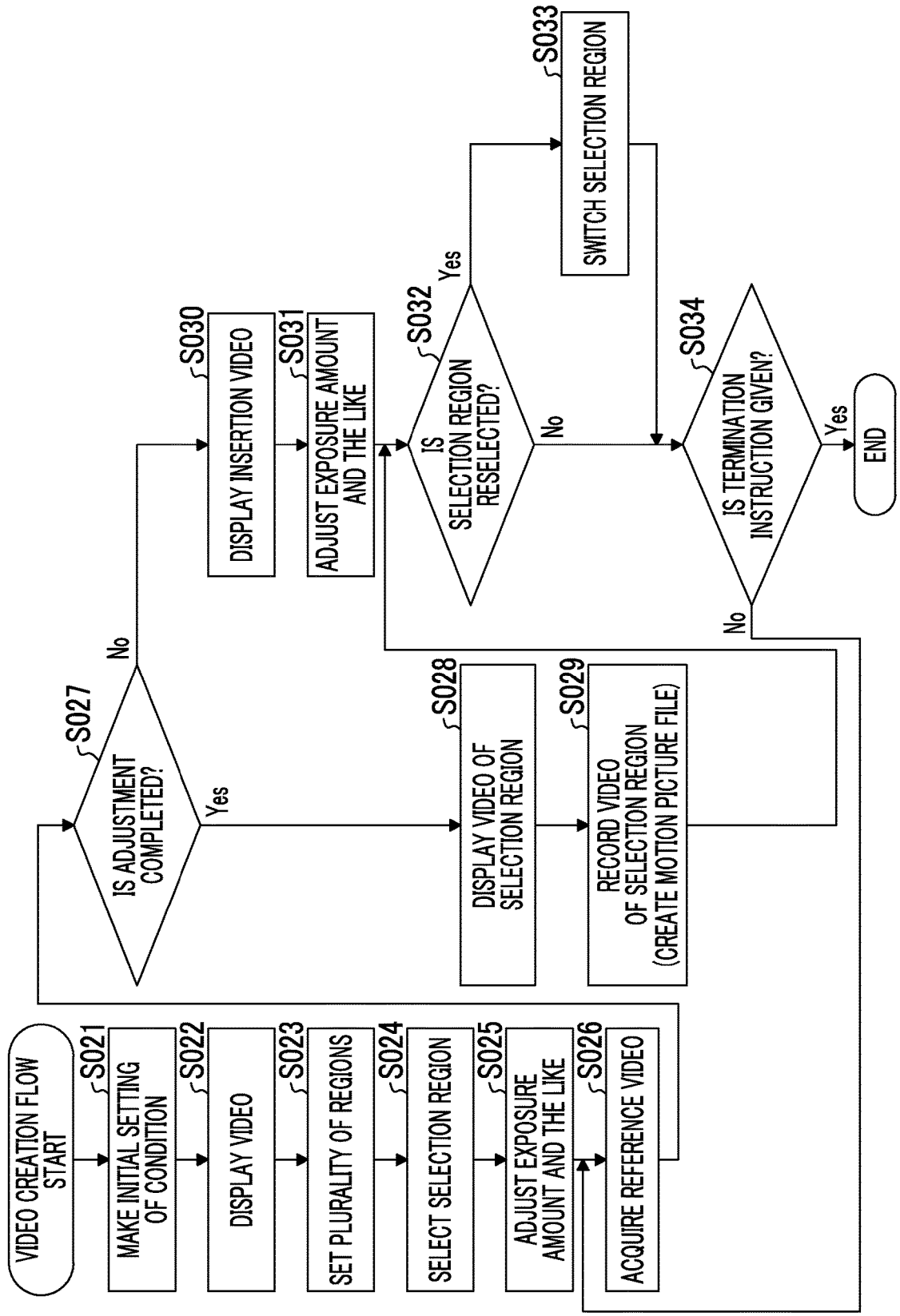
FIG. 11 is an explanatory diagram of a video creation flow according to a second embodiment which is one embodiment of the present invention.

On the other hand, the display time of the insertion video Pi may be determined based on the required time for the adjustment of the adjustment step executed after the switching step, instead of displaying the insertion video Pi only for the display time in advance. For example, the insertion video Pi may continue to be displayed until the adjustment step executed after the switching step is completed. The present embodiment is referred to as a second embodiment, and the second embodiment will be described below with reference to FIG. 11. FIG. 11 is an explanatory diagram of a flow of a video creation flow according to the second embodiment.

It should be noted that, in the following, the items different from those in the first embodiment will be mainly described in the second embodiment.

As can be seen by comparing FIGS. 10 and 11, each step in the video creation flow according to the second embodiment is generally common to each step in the video creation flow according to the first embodiment.

Specifically, step S027 in the video creation flow according to the second embodiment is different from step S007 in the video creation flow according to the first embodiment. Except for this point, in the video creation flow according to the second embodiment, the contents and the execution order of each step (S021 to S026, and S028 to S34) other than step S027 are common to the steps in the video creation flow according to the first embodiment.

In step S007 of the video creation flow according to the first embodiment, it is determined whether or not a predetermined period has elapsed from the preceding execution of the adjustment step. On the other hand, in step S027 of the video creation flow according to the second embodiment, it is determined whether or not the adjustment step executed along with the switching step is completed.

Specifically, in a case in which the stop amount is adjusted such that the exposure amount becomes the target exposure amount in the adjustment step, in step S027, it is determined whether or not the drive of the stop driving unit 23 for adjusting the stop amount is completed. More specifically, in a case in which the adjustment of the stop amount is completed, the stop driving unit 23 outputs a signal in conjunction with the adjustment. In a case in which the output signal is received from the stop driving unit 23, the control unit 46 determines that the stop amount adjustment is completed at that time.

In addition, in a case in which the focus is adjusted to focus on the subject reflected in the video of the selection region in the adjustment step, in step S027, it is determined whether or not the drive of the driving unit for focus 22 for the focus adjustment is completed. More specifically, in a case in which the focus adjustment is completed, the driving unit for focus 22 outputs a signal in conjunction with the focus adjustment. In a case in which the output signal is received from the driving unit for focus 22, the control unit 46 determines that the focus adjustment is completed at that time.

Moreover, during the period in which it is determined in step S027 that the adjustment is not completed yet, the control unit 46 continues to display the insertion video Pi in the display step. That is, as long as any of the drive of the stop driving unit 23 for adjusting the stop amount or the drive of the driving unit for focus 22 for adjusting the focus continues, the insertion video Pi is displayed.

As described above, in the second embodiment, the adjustment step is executed along with the switching step, and in the adjustment step, the display time of the insertion video Pi is determined based on the adjustment time of the exposure amount and the like. For example, the insertion video Pi is displayed until the adjustment of the exposure amount or the like is completed. Stated another way, in the second embodiment, the length of the display period of the insertion video Pi is changed in accordance with the required time for adjusting the stop amount or the focus in the adjustment step. As a result, it is possible to secure that the post-switching video Pa is not shown to the user until the adjustment of the exposure amount or the like is almost completed. As a result, it is possible to effectively suppress the discomfort given to the user by displaying the post-switching video Pa during the adjustment.

Figure 12:
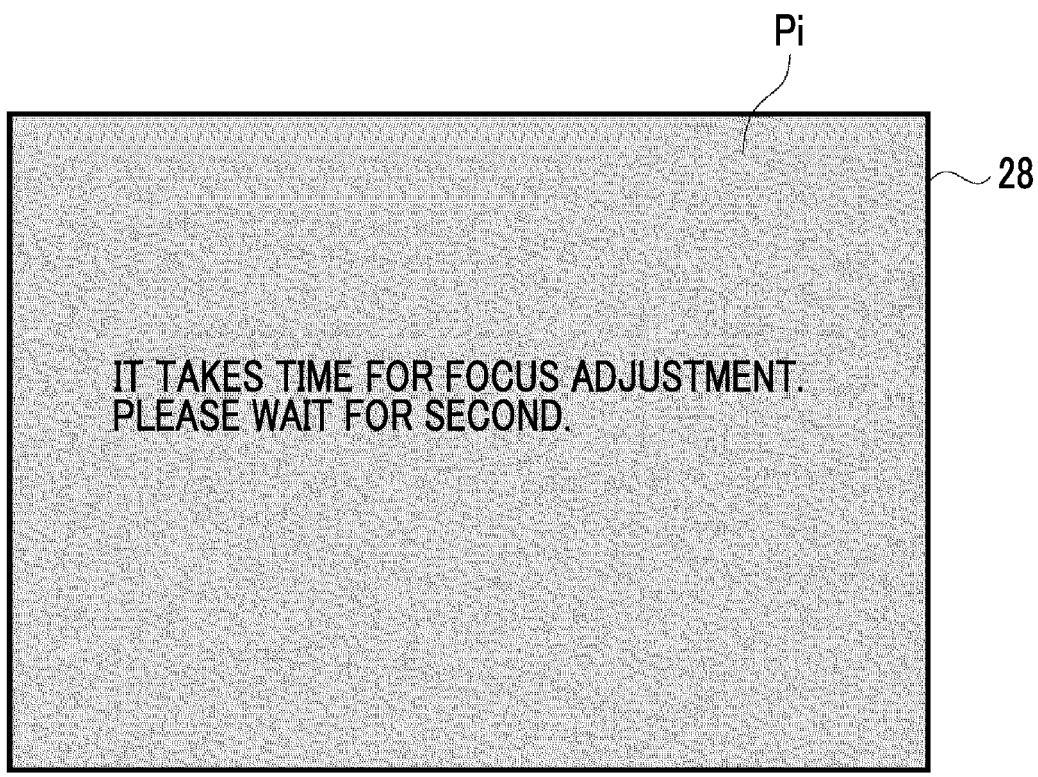
FIG. 12 is a diagram showing a first modification example of an insertion video.

In addition, in the second embodiment, in a case in which the required time for adjustment is equal to or longer than a predetermined time, the control unit 46 may display the insertion video Pi as shown in FIG. 12 in the display step. FIG. 12 shows a first modification example of the insertion video Pi.

The insertion video Pi shown in FIG. 12 includes information relating to the required time for adjustment. Here, the information relating to the required time for adjustment corresponds to, for example, a remaining time until the adjustment is completed, or a message prompting the user to wait until the adjustment is completed.

As described above, by displaying the insertion video Pi including the information relating to the required time for adjustment, it is possible to inform the user that it takes time to adjust the stop amount or the focus, for example.

Third Embodiment

As described in the embodiments described above, in a case in which the switching step is executed to switch the selection region, the adjustment step is executed accordingly to adjust the exposure amount, the white balance, and the focus. In a case in which the exposure amount or the like is adjusted, it is common to adjust the exposure amount such that the exposure amount is gradually changed over time to suppress a sudden change. It should be noted that the switching step is executed, it is necessary to promptly complete the adjustment from the viewpoint of securing the image quality of the post-switching video Pa.

Figure 13:
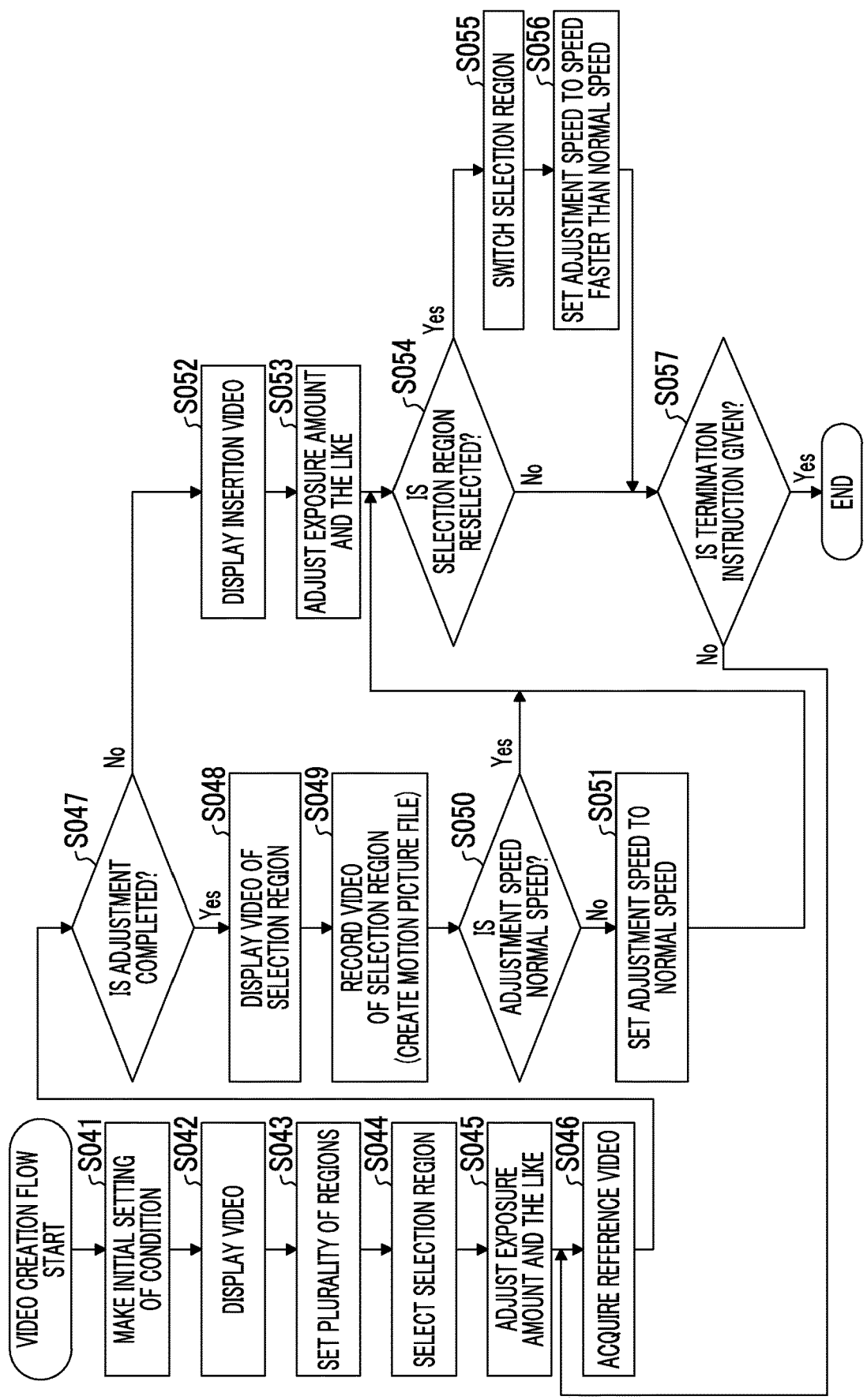
FIG. 13 is an explanatory diagram of a video creation flow according to a third embodiment which is one embodiment of the present invention.

In consideration of the points described above, it is preferable to adjust the exposure amount and the like at a speed faster than a normal speed immediately after the switching step is executed. Such an embodiment is referred to as a third embodiment, and the third embodiment will be described below with reference to FIG. 13. FIG. 13 is an explanatory diagram of a video creation flow according to the third embodiment.

As shown in FIG. 13, in the video creation flow according to the third embodiment, steps S041 to S045 are common to steps S001 to S005 in the video creation flow according to the first embodiment. That is, in the video creation flow according to the third embodiment, first, various conditions are initially set, the reference video is displayed along with the start of video capturing, the plurality of regions A2 are set, and the selection region is selected from among the plurality of regions A2 (S041 to S044).

In a case in which the selection region is selected, the exposure amount, the focus, and the white balance are adjusted for the selection region (S045). In this step S045, in order to adjust the exposure amount, the stop driving unit 23 is controlled to change the stop amount. In addition, in order to adjust the focus, the driving unit for focus 22 is controlled to move the optical component for focus 19. In this case, each adjustment of the exposure amount and the focus is executed at a normal adjustment speed. Stated another way, each of the stop driving unit 23 and the driving unit for focus 22 is driven at a normal drive speed.

Thereafter, step S046 and the subsequent steps are executed triggered by an operation of pressing down the release button 26 or the like by the user. Specifically, the reference video for one frame is acquired (S046), and the video of the selection region is displayed (S048).

In addition, in a case in which the selection region is reselected, the switching step is executed to switch the selection region (S054 and S055). Moreover, in a case in which the switching step is executed, the insertion video Pi is displayed (S052), and the exposure amount or the like is adjusted during the display period of the insertion video Pi (S053). In this step S053, as in step S045, the stop driving unit 23 changes the stop amount to adjust the exposure amount, and the driving unit for focus 22 moves the optical component for focus 19 to adjust the focus.

In addition, in the third embodiment, the adjustment speed during the display period of the insertion video Pi is set to a speed faster than the normal adjustment speed (in other words, period other than the display period of the insertion video Pi) (S056). Here, the adjustment speed is an adjustment speed in a case in which the stop amount or the focus is adjusted, in other words, the drive speed of the stop driving unit 23 or the driving unit for focus 22.

It should be noted that the adjustment speed during the display period of the insertion video Pi may be optionally determined as long as the adjustment speed is faster than the normal adjustment speed, but is preferably faster than the normal adjustment speed by 1.5 times or more, and more preferably faster than the normal adjustment speed by twice or more.

As described above, in the third embodiment, in the adjustment step executed during the display period of the insertion video Pi, the stop amount or the focus is adjusted at a speed faster than a normal speed. Stated another way, while the insertion video Pi is displayed, the stop driving unit 23 or the driving unit for focus 22 is driven at a speed faster than a normal speed. As a result, the exposure amount or the focus of the post-switching video Pa is promptly optimized and reaches the target value at an early stage. In addition, even in a case in which the exposure amount or the focus is changed promptly, the insertion video Pi is displayed during the adjustment, so that the influence of the sudden change in the exposure amount or the focus (for example, discomfort felt by the user) can be suppressed.

In addition, in the third embodiment, as in the second embodiment, it is determined whether or not the stop amount adjustment and the focus adjustment after the switching step are completed (S047), and the insertion video Pi is displayed until the adjustment is completed. It should be noted that the present invention is not limited to this, and in the third embodiment, the insertion video Pi may be displayed for the predetermined period.

It should be noted that, in the third embodiment, since the adjustment speed during the display period of the insertion video Pi is faster than the normal adjustment speed, the display period of the insertion video Pi can be further shortened.

After the adjustment of the stop amount and the focus is completed, it is determined whether the adjustment speed returns to the normal speed (S050). In a case in which the adjustment speed does not return to the normal speed, the adjustment speed is set to the normal speed (S051), and then the process proceeds to step S054. On the other hand, in a case in which the adjustment speed returns to the normal speed, the process proceeds to step S054 as it is.

A series of steps up to the above (that is, steps S046 to S056) is repeated for each frame until the user gives the termination instruction (S057). Moreover, at the time when the user gives the termination instruction, the video creation flow according to the third embodiment is terminated.

Fourth Embodiment

The mode for adjusting the focus of the imaging lens 14 includes the manual focus mode and the autofocus mode. In the imaging apparatus 10 in which these two modes can be selected, the focus is adjusted in the selected mode. In a case in which the video is captured with the subject fixed, the focus need only be adjusted once manually to focus on the subject, and the manual focus mode is usually selected.

On the other hand, in a case in which the selection region is switched in the configuration in which the video of a part of the region (that is, the video of the selection region) is extracted from the captured video, it is necessary to adjust the focus for the selection region after the switching. In this case, even in a case in which the manual focus mode is selected, it is preferable to automatically adjust the focus to the switched selection region during the display period of the insertion video Pi. This is because the user cannot confirm the video of the post-switching selection region (that is, post-switching video Pa) during the display period of the insertion video Pi.

Figure 14:
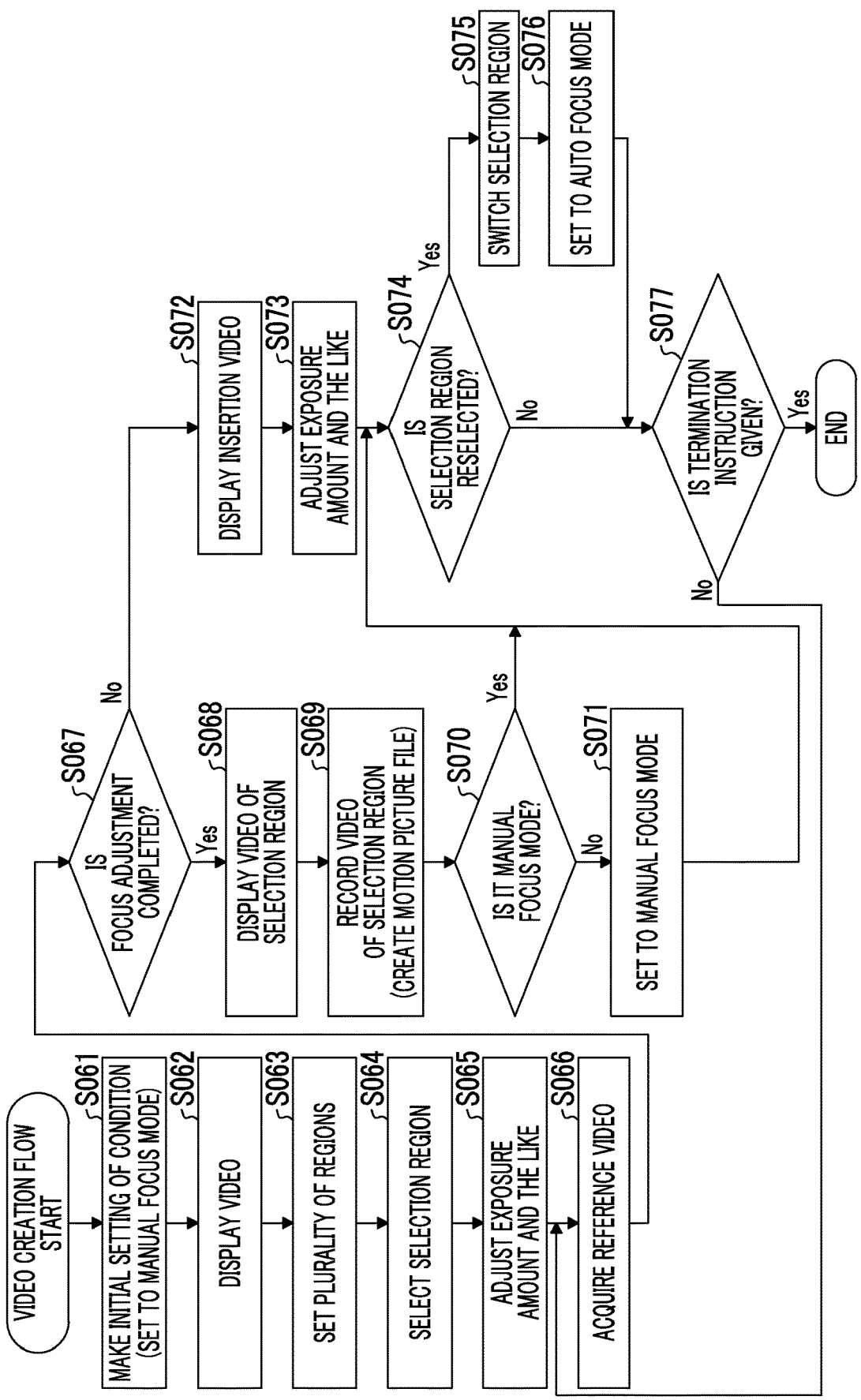
FIG. 14 is an explanatory diagram of a video creation flow according to a fourth embodiment which is one embodiment of the present invention.

The present embodiment is referred to as a fourth embodiment, and the fourth embodiment will be described below with reference to FIG. 14. FIG. 14 is an explanatory diagram of a video creation flow according to the fourth embodiment.

As shown in FIG. 14, in the video creation flow according to the fourth embodiment, steps S061 to S065 are common to steps S001 to S005 in the video creation flow according to the first embodiment. That is, in the video creation flow according to the fourth embodiment, first, initial settings of various conditions are made (S061). Here, in step S061, the focus adjustment mode is set to the manual focus mode.

Thereafter, the reference video is displayed along with the start of video capturing, the plurality of regions A2 are set, the selection region is selected from among the selection regions, and the exposure amount, the focus, and the white balance are adjusted for the selection region (S062 to S065). In step S065, the exposure amount and the white balance are automatically adjusted by the control unit 46. The focus is manually adjusted by the focus ring 16 operated by the user.

Thereafter, step S066 and the subsequent steps are executed triggered by an operation of pressing down the release button 26 or the like by the user. Specifically, the reference video for one frame is acquired (S066), and the video of the selection region is displayed (S068).

In addition, in a case in which the selection region is reselected, the switching step is executed to switch the selection region (S074 and S075). Moreover, in a case in which the switching step is executed, the insertion video Pi is displayed (S072), and the adjustment step is executed to adjust the exposure amount and the like during the display period of the insertion video Pi (S073). In this step S073, the exposure amount and the white balance are automatically adjusted, and the focus is also automatically adjusted.

More specifically, in a case in which the switching step is executed and the selection region is switched, the focus adjustment mode, which has been the manual focus mode until then, is set to the autofocus mode (S076). As a result, in the adjustment step during the display period of the insertion video Pi, the focus is automatically adjusted in the autofocus mode. That is, in the fourth embodiment, even in a case in which the manual focus mode is normally selected, the focus is automatically adjusted immediately after the selection region is switched. As a result, it is not necessary for the user to adjust the focus each time the selection region is switched, and the convenience (usability) for the user is improved.

In addition, in the adjustment step executed during the display period of the insertion video Pi, the focus is adjusted by the second method described above, and strictly speaking, the image plane phase difference autofocus is adopted for adjustment.

In particular, in the fourth embodiment, during the display period of the insertion video Pi, the focus is adjusted by the image plane phase difference autofocus, which is the second method, regardless of the value of the stop amount. In a case in which the stop amount is sufficiently large (that is, in a case in which the aperture size is sufficiently small), the adjustment accuracy is decreased in the image plane phase difference autofocus. Therefore, it is common to use the contrast autofocus in a case in which the stop amount is larger than an appropriate value. The appropriate value is the stop amount that is considered to be better in terms of adjustment accuracy in a case in which using the contrast autofocus rather than the image plane phase difference autofocus, and is expressed in F-number from F9 to F13.

On the other hand, in a case in which the image plane phase difference autofocus is adopted, the focus adjustment speed becomes faster. Based on this point, in the adjustment step executed during the display period of the insertion video Pi in the fourth embodiment, even in a case in which the stop amount is larger than the appropriate value described above, in order to prioritize the focus adjustment speed, the image plane phase difference autofocus is adopted. As a result, the focus can be promptly adjusted after the selection region is switched, and the post-switching video Pa can be promptly focused after the switching.

In addition, in the fourth embodiment, it is determined whether or not the focus adjustment after the switching step is completed (S067), and the insertion video Pi is displayed until the adjustment is completed. It should be noted that the present invention is not limited to this, and in the fourth embodiment, the control unit 46 may display the insertion video Pi for the predetermined period. In addition, in the fourth embodiment, the control unit 46 may display the post-switching video Pa in a case in which the focus adjustment is almost completed.

After the focus adjustment is completed, it is determined whether the focus adjustment mode returns to the manual focus mode (S070). In this case, in a case in which the focus adjustment mode is the autofocus mode, the manual focus mode is set (S071), and then the process proceeds to step S074. On the other hand, in a case in which the adjustment speed returns to the normal adjustment speed, the process proceeds to step S074 as it is.

A series of steps up to the above (that is, steps S066 to S076) is repeatedly executed until the user gives the termination instruction (S077). Moreover, at the time when the user gives the termination instruction, the video creation flow according to the fourth embodiment is terminated.

As described above, in the fourth embodiment, even in a case in which the manual focus mode is selected, the focus is automatically adjusted immediately after the selection region is switched, but the present invention is not limited to this. For example, the control unit 46 may have a full manual mode in which the focus is manually adjusted over the entire period during imaging, including the adjustment step immediately after the selection region is switched, as the focus adjustment mode.

In addition, the contents described above can be applied to the adjustment of the exposure amount, in addition to the focus adjustment. That is, as a mode for adjusting the exposure amount, the manual adjustment mode in which the exposure amount is manually adjusted based on the operation of the user and the auto adjustment mode in which the exposure amount is automatically adjusted can be selected. In a case in which the manual adjustment mode is selected in such a configuration, the exposure amount may be automatically adjusted in the adjustment step (that is, the adjustment step during the display period of the insertion video Pi) immediately after the selection region is switched. As a result, it is not necessary for the user to adjust the exposure amount each time the selection region is switched, and the convenience for the user is improved.

Fifth Embodiment

In the five embodiments described above, the video is the motion picture, that is, a set of a plurality of frame images consecutively captured at a fixed frame rate. It should be noted that the recorded video is not limited to the motion picture, and may be a still picture.

For example, the control unit 46 displays the reference video shown in FIG. 6 as a live view image on the display 28, and sets a plurality of partial regions A2 in the imaging region of the reference video. Moreover, in a case in which the user selects one of the plurality of set regions A2 as the selection region, the control unit 46 extracts and displays the video of the selection region on the display 28 as shown in FIG. 7. In a case in which the recording instruction of the user is input while the extracted video of the selection region is displayed, the control unit 46 records a still picture file of the video of the selection region on the recording medium.

Moreover, in a case in which the selection region is switched, the insertion video Pi need only be displayed thereafter, and the exposure amount and the like need only be adjusted for the post-switching selection region by using the display period of the insertion video Pi.

Figure 16:
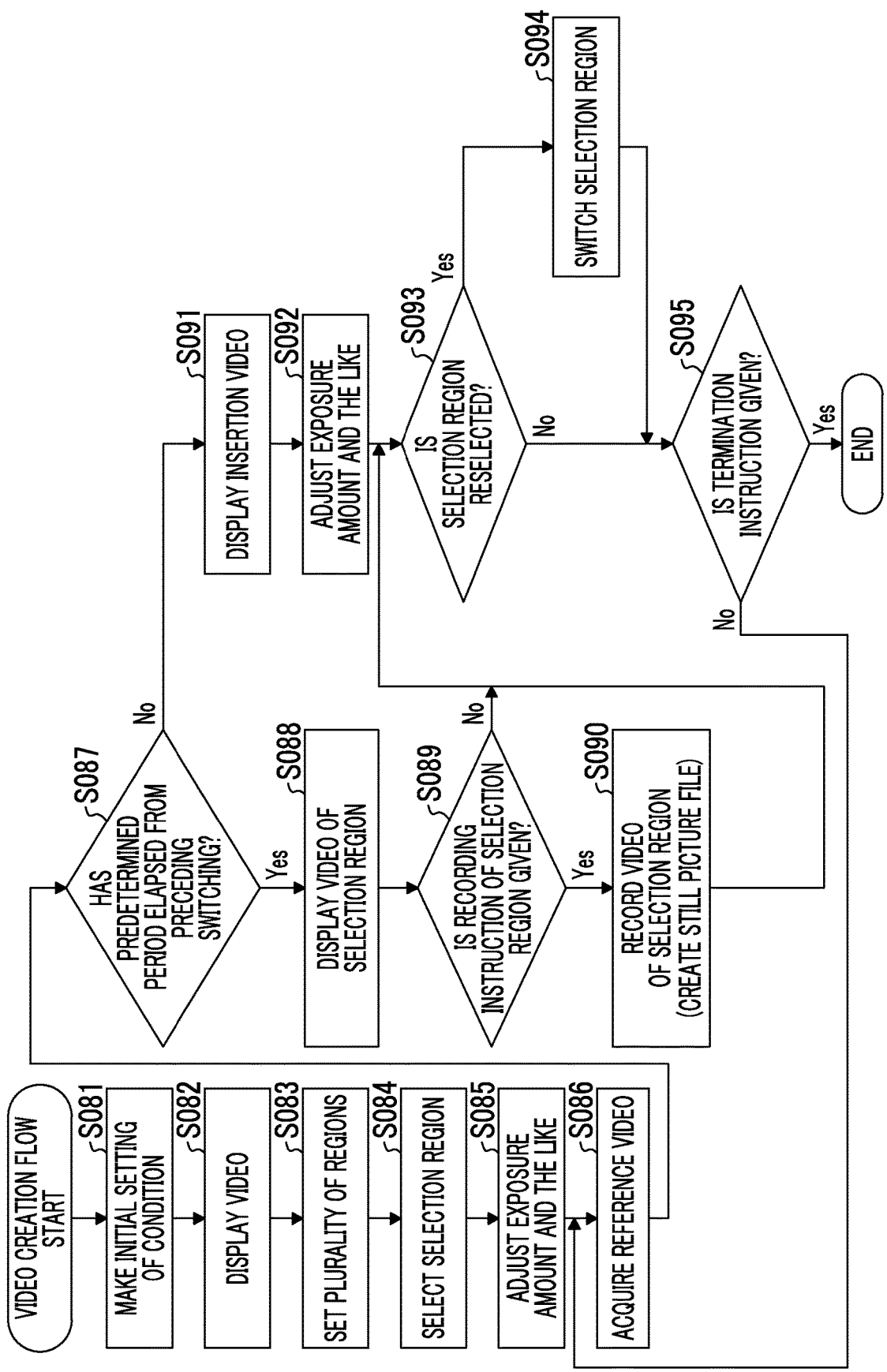
FIG. 16 is an explanatory diagram of a video creation flow according to a fifth embodiment which is one embodiment of the present invention.

The present embodiment is referred to as a fifth embodiment, and the fifth embodiment will be described below with reference to FIG. 16. FIG. 16 is an explanatory diagram of a flow of a video creation flow according to the fifth embodiment.

In the video creation flow according to the fifth embodiment, as can be seen by comparing FIGS. 10 and 16, steps S089 and S090 relating to recording of the video of the selection region are different from the video creation flow according to the first embodiment.

Specifically, in the first embodiment, after the video of the selection region is displayed (S008), the video of the selection region is recorded and the motion picture file is created (S009).

On the other hand, in the fifth embodiment, after the video of the selection region is displayed (S088), the control unit 46 determines whether or not there is the recording instruction of the video of the selection region by the user (S089). In a case in which the control unit 46 determines that there is no recording instruction in this step S089, the process proceeds to step S093 for determining whether or not the selection region is reselected.

On the other hand, in a case in which it is determined in step S089 that there is the recording instruction, the control unit 46 records the video of the selection region on the recording medium as the still picture file (S090). After the video of the selection region is recorded on the recording medium, the process proceeds to step S093 for determining whether or not the selection region is reselected.

It should be noted that, the recorded video is the still picture, the shutter speed that determines the exposure time may be the shutter speed of the electronic shutter, or may be the shutter speed of the shutter 38 (focal plane shutter), which is a mechanical component.

OTHER EMBODIMENTS

The embodiments described above are specific examples described for ease of understanding of the video creation method according to one embodiment of the present invention and are merely examples, and other embodiments are also considered.

For example, in the embodiments described above, the imaging apparatus 10 comprising the electronic dimming filter 21 has been described, but the imaging apparatus that does not include the electronic dimming filter 21 may be used.

Figure 15:
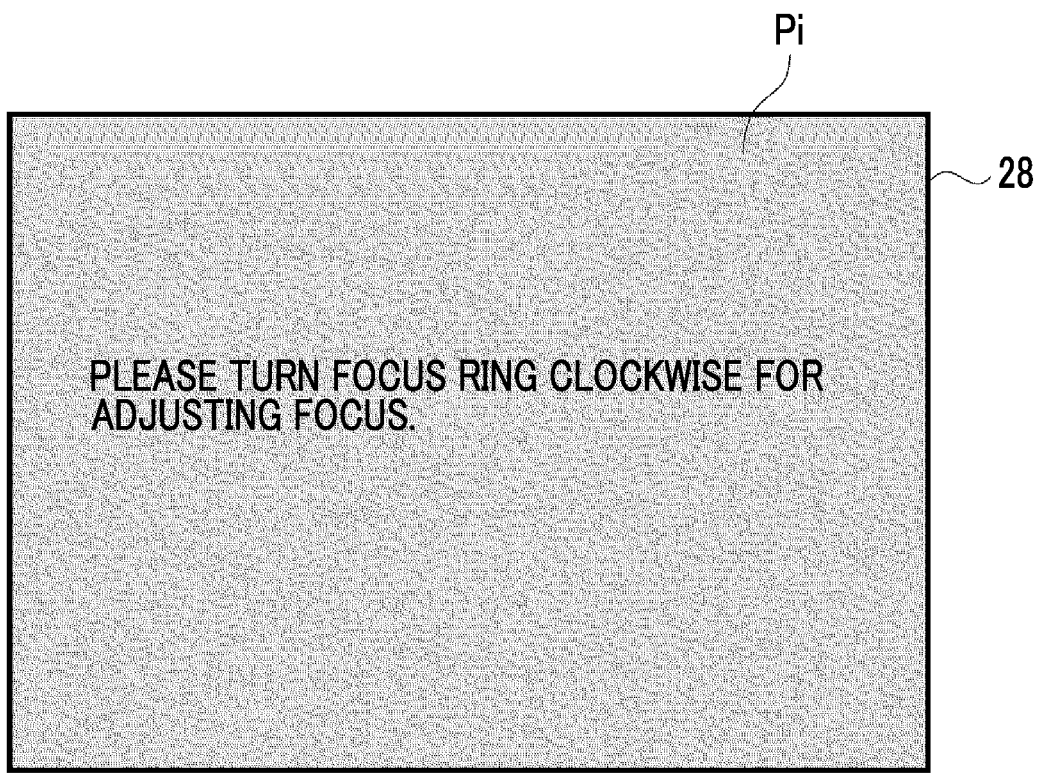
FIG. 15 is a diagram showing a second modification example of the insertion video.

In addition, in the embodiments described above, the imaging apparatus 10 having the autofocus function is used, but the present invention is not limited to this, and the imaging apparatus that does not have the autofocus function may be used. That is, the driving unit for focus 22 may not be provided and the focus may be is adjusted only by the operation of the focus ring 16 (that is, only manual operation). In this case, the insertion video Pi as shown in FIG. 15 may be displayed in the display step after the selection region is switched. FIG. 15 shows a second modification example of the insertion video Pi.

The insertion video Pi shown in FIG. 15 includes guide information for manually adjusting the focus. Here, the guide information corresponds to a message or the like indicating a direction in a case in which the focus ring 16 is turned to be in focus.

As described above, by displaying the insertion video Pi including the guide information for focus adjustment, the focus can be appropriately adjusted manually according to the guide information even in the imaging apparatus that does not have the autofocus function.

In addition, in the embodiments described above, the imaging apparatus 10 creates the video file as the video creation apparatus, but the present invention is not limited to this. For example, another device connected to the imaging apparatus by wire or wirelessly, for example, a camera controller or an external recorder may be used as the video creation apparatus. Moreover, the video file of the video captured by the imaging apparatus may be created by these devices.

In addition, in the embodiments described above, the imaging apparatus is the digital camera, but the imaging apparatus may be a portable terminal, such as a video camera, a portable phone with an imaging optical system, a smartphone, or a tablet terminal.

In addition, the imaging lens may be a lens unit externally attached to the imaging optical system of the portable terminal described above.

EXPLANATION OF REFERENCES

- 10: imaging apparatus
- 12: imaging apparatus body
- 13: mount
- 14: imaging lens
- 16: focus ring
- 18: optical component unit
- 19: optical component for focus
- 20: stop
- 21: electronic dimming filter
- 22: driving unit for focus
- 23: stop driving unit
- 24: voltage application unit
- 26: release button
- 28: display
- 30: first operation button
- 32: second operation button
- 34: third operation button
- 36: touch panel
- 38: shutter
- 40: imaging element
- 42: pixel
- 44: analog signal processing circuit
- 46: control unit
- 47: controller
- 48: video processing unit
- 50: internal memory
- 52: card slot
- 54: memory card
- 56: buffer
- A0: unit region
- A1: imaging region
- A2: region
- L1: optical axis
- Pa: post-switching video
- Pb: pre-switching video
- Pi: insertion video
- FR: region setting frame

What is claimed is:

1. A video creation method of creating a video file based on a video captured by an imaging apparatus including an imaging lens and an imaging element, the method comprising:
   a setting step of setting, in an imaging region of a reference video having a first angle of view, a plurality of regions having a second angle of view smaller than the first angle of view;
   a selection step of selecting a selection region in which a recorded video is reflected from among the plurality of regions;
   a switching step of reselecting the selection region from among the plurality of regions to switch the selection region after the selection step is executed;
   a recording step of recording each of a pre-switching video which is a video of the selection region before the switching step and a post-switching video which is a video of the selection region after the switching step;
   a display step of displaying the post-switching video after the pre-switching video is displayed and displaying an insertion video in a period between a display period of the pre-switching video and a display period of the post-switching video; and
   an adjustment step of adjusting, during a display period of the insertion video, at least one of an exposure amount of the selection region after the switching step, white balance of the post-switching video, or focus of the imaging lens after the switching step.

2. The video creation method according to claim 1, wherein the insertion video is a video based on the pre-switching video and the post-switching video, or a video based on none of the reference video, the pre-switching video, and the post-switching video.

3. The video creation method according to claim 2, wherein, in the recording step, the pre-switching video and the post-switching video are combined to create a motion picture file.

4. The video creation method according to claim 3, wherein, in the recording step, the insertion video is excluded from a recording target.

5. The video creation method according to claim 2, wherein the exposure amount is adjusted by adjusting a stop amount for an incidence ray on the imaging lens, and
   in a case in which the stop amount or the focus is adjusted in the adjustment step, a length of the display period of the insertion video is changed in accordance with a required time for adjusting the stop amount or the focus in the adjustment step.

6. The video creation method according to claim 5, wherein, in a case in which the required time is equal to or longer than a predetermined time, in the display step, the insertion video including information relating to the required time is displayed.

7. The video creation method according to claim 2,
wherein the exposure amount is adjusted by adjusting a stop amount for an incidence ray on the imaging lens, and
in a case in which the stop amount or the focus is adjusted in the adjustment step, in the display period of the insertion video, an adjustment speed of the stop amount or the focus is faster than in a period other than the display period of the insertion video.

8. The video creation method according to claim 2,
wherein a mode for adjusting the focus is selected from among a manual focus mode in which the focus is manually adjusted based on an operation of a user and an autofocus mode in which the focus is automatically adjusted, and
in a case in which the manual focus mode is selected, in the adjustment step during the display period of the insertion video, the focus is automatically adjusted.

9. The video creation method according to claim 2,
wherein, as a method of automatically adjusting the focus, a first method of contrast autofocus, and a second method selected from among image plane phase difference autofocus, directional light beam autofocus, and depth-from-defocus method autofocus are used, and
in the adjustment step during the display period of the insertion video, the focus is adjusted by the second method.

10. The video creation method according to claim 9,
wherein the exposure amount is adjusted by adjusting a stop amount for an incidence ray on the imaging lens, the second method is the image plane phase difference autofocus, and
in the adjustment step during the display period of the insertion video, the focus is adjusted by the second method regardless of a value of the stop amount.

11. The video creation method according to claim 1,
wherein, in the recording step, the pre-switching video and the post-switching video are combined to create a motion picture file.

12. The video creation method according to claim 11,
wherein, in the recording step, the insertion video is excluded from a recording target.

13. The video creation method according to claim 1,
wherein the exposure amount is adjusted by adjusting a stop amount for an incidence ray on the imaging lens, and
in a case in which the stop amount or the focus is adjusted in the adjustment step, a length of the display period of the insertion video is changed in accordance with a required time for adjusting the stop amount or the focus in the adjustment step.

14. The video creation method according to claim 13,
wherein, in a case in which the required time is equal to or longer than a predetermined time, in the display step, the insertion video including information relating to the required time is displayed.

15. The video creation method according to claim 1,
wherein the exposure amount is adjusted by adjusting a stop amount for an incidence ray on the imaging lens, and
in a case in which the stop amount or the focus is adjusted in the adjustment step, in the display period of the insertion video, an adjustment speed of the stop amount or the focus is faster than in a period other than the display period of the insertion video.

16. The video creation method according to claim 1,
wherein a mode for adjusting the focus is selected from among a manual focus mode in which the focus is manually adjusted based on an operation of a user and an autofocus mode in which the focus is automatically adjusted, and
in a case in which the manual focus mode is selected, in the adjustment step during the display period of the insertion video, the focus is automatically adjusted.

17. The video creation method according to claim 1,
wherein, as a method of automatically adjusting the focus, a first method of contrast autofocus, and a second method selected from among image plane phase difference autofocus, directional light beam autofocus, and depth-from-defocus method autofocus are used, and
in the adjustment step during the display period of the insertion video, the focus is adjusted by the second method.

18. The video creation method according to claim 17,
wherein the exposure amount is adjusted by adjusting a stop amount for an incidence ray on the imaging lens, the second method is the image plane phase difference autofocus, and
in the adjustment step during the display period of the insertion video, the focus is adjusted by the second method regardless of a value of the stop amount.

19. The video creation method according to claim 1,
wherein, in a case in which the imaging apparatus does not have a function of automatically adjusting the focus, the focus is manually adjusted based on an operation of a user, and
in the display step, the insertion video including guide information for manually adjusting the focus is displayed.

20. The video creation method according to claim 1,
wherein a mode for adjusting the exposure amount is selected from among a manual adjustment mode in which the exposure amount is manually adjusted based on an operation of a user and an auto adjustment mode in which the exposure amount is automatically adjusted, and
in a case in which the manual adjustment mode is selected, in the adjustment step during the display period of the insertion video, the exposure amount is automatically adjusted.

* * * * *